(12) United States Patent
Myers et al.

(10) Patent No.: US 8,129,306 B2
(45) Date of Patent: Mar. 6, 2012

(54) NON-PLATINUM BIMETALLIC POLYMER ELECTROLYTE FUEL CELL CATALYSTS

(75) Inventors: Deborah J. Myers, Lisle, IL (US);
Xiaoping Wang, Naperville, IL (US);
Nancy N. Kariuki, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 245 days.

(21) Appl. No.: 12/361,366

(22) Filed: Jan. 28, 2009

(65) Prior Publication Data

US 2009/0192030 A1    Jul. 30, 2009

Related U.S. Application Data

(60) Provisional application No. 61/062,634, filed on Jan. 28, 2008.

(51) Int. Cl.
| | |
|---|---|
| B01J 23/00 | (2006.01) |
| B01J 23/38 | (2006.01) |
| B01J 23/40 | (2006.01) |
| B01J 23/44 | (2006.01) |
| B01J 23/46 | (2006.01) |
| B01J 23/48 | (2006.01) |
| B01J 23/52 | (2006.01) |
| B01J 23/54 | (2006.01) |
| B01J 23/56 | (2006.01) |
| B01J 23/60 | (2006.01) |
| B01J 23/66 | (2006.01) |
| B01J 23/70 | (2006.01) |
| B01J 23/74 | (2006.01) |
| B01J 23/745 | (2006.01) |
| B01J 23/75 | (2006.01) |
| B01J 23/755 | (2006.01) |
| B01J 23/72 | (2006.01) |

(52) U.S. Cl. ......... 502/326; 75/351; 502/325; 502/328; 502/329; 502/330; 502/331; 502/339; 502/344; 502/345

(58) Field of Classification Search ....................... None
See application file for complete search history.

(56) References Cited

U.S. PATENT DOCUMENTS

| | | | | |
|---|---|---|---|---|
| 5,489,563 | A * | 2/1996 | Brand et al. ................. | 502/185 |
| 6,670,515 | B1 * | 12/2003 | Dubois et al. ................ | 585/269 |
| 7,109,145 | B2 * | 9/2006 | Ruth et al. .................... | 502/326 |
| 7,223,493 | B2 * | 5/2007 | Terada et al. ................. | 429/44 |
| 2005/0235776 | A1 * | 10/2005 | He et al. ........................ | 75/255 |

OTHER PUBLICATIONS

Greeley et al., "Alloy Catalysts Designed from First Principles", *Nature Materials*, Nov. 2004, pp. 810-815, vol. 3, Nature Publishing Group, www.nature.com/naturematerials.

(Continued)

*Primary Examiner* — Melvin Mayes
*Assistant Examiner* — Colin W Slifka
(74) *Attorney, Agent, or Firm* — Foley & Lardner LLP

(57) ABSTRACT

A polymetallic nanoparticle alloy having enhanced catalytic properties including at least one noble metal and at least one base metal, where the noble metal is preferentially dispersed near the surface of the nanoparticle and the base metal modifies the electronic properties of the surface disposed noble metal. The polymetallic nanoparticles having application as a catalyst when dispersed on a carbon substrate and in particular applications in a fuel cell. In various embodiments a bimetallic noble metal-base metal nanoparticle alloy may be used as an electrocatalyst offering enhanced ORR activity compared to the monometallic electrocatalyst of noble metal.

19 Claims, 19 Drawing Sheets

OTHER PUBLICATIONS

Greeley et al., "Alloys of Platinum and Early Transition Metals as Oxygen Reduction Electrocatalysts", *Nature Chemistry*, Sep. 23, 2009, pp. 552-556, vol. 1, Macmilan Publishers Limited, www.nature.com/naturechemistry.

Hammer et al., "Theoretical Surface Science and Catalysis—Calculations and Concepts", *Advances in Catalysis*, (2000), pp. 71-129, vol. 45, Academic Press.

Khanra et al., "Adsorption-introduced MC Simulation Technique for Segregation Studies in Pd-Ag Nanoparticles", *Physica B*, (2000), pp. 368-372, vol. 291, Elsevier Science B.V.

Luo et al., "Preparation and Characterization of Carbon-Supported PtVFe Electrocatalysts", *Electrochimica Acta* 51, (2006), pp. 4821-4827, Elsevier.

Luo et al., "Thermal Activation of Molecularly-Wired Gold Nanoparticles on a Substrate as Catalyst", *JACS Communications*, (2002), pp. 13988-13989, vol. 124, American Chemical Society.

Menon et al., Spatial Distribution of Atoms in Gas-Covered Pd-X Nanoparticles (X=Ag, Cu, Ni, Pt), *International Journal of Mordem Physics B*, (2000), pp. 1683-1693, vol. 14, No. 16, World Scientific Publishing Company.

Paulus et al., "New PtRu Alloy Colloids as Precursors for Fuel Cell Catalysts", *Journal of Catalysis*, (2000), pp. 383-393, vol. 195, Academic Press.

Ruban et al., "Surface Electronic Structure and Reactivity of Transition and Noble Metals", *Journal of Molecular Catalysis A-Chemical*, (1997), pp. 421-429, vol. 115, Elsevier science B.V.

Ruban et al., "Surface Segregation Energies in Transition-Metal Alloys", *Physical Review B*, Jun. 15, 1999, pp. 15 990-16 000, vol. 59, No. 24, The American Physical Society, USA.

Stamenkovic, et al., "Changing the Activity of Electrocatalysts for Oxygen Reduction by Tuning the Surface Electronic Structure", *Angewandte Chemie, International Edition*, (2006), pp. 2897-2901, vol. 45, Wiley-VCH Verlag GmbH & Co. KgaA, Weinheim.

Venezia et al., "Catalytic Co Oxidation Over Pumice Supported Pd-Ag Catalysts", *Applied Catalysis A, General*, (2001), pp. 167-174, Elsevier Science B.V.

Xiong et al., "Influence of Atomic Ordering on the Electrocatalytic Activity of Pt-Co Alloys in Alkaline Electrolyte and Proton Exchange Membrane Fuel Cells", *J.Mater. Chem.*, (2004), pp. 1454-1460, The Royal Society of Chemistry.

* cited by examiner

E (V vs. SHE)

FIG. 15A(1)    FIG. 15B(1)    FIG. 15C(1)
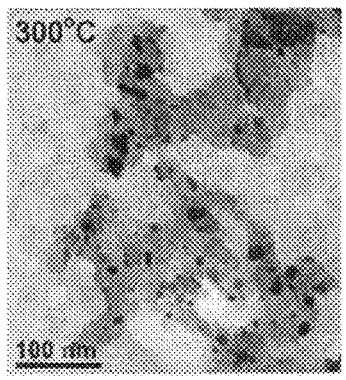  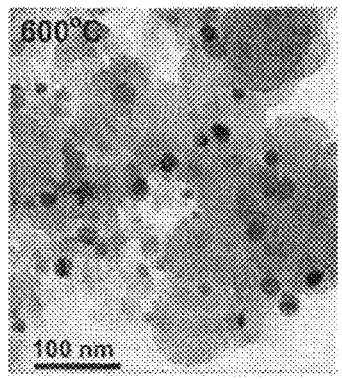  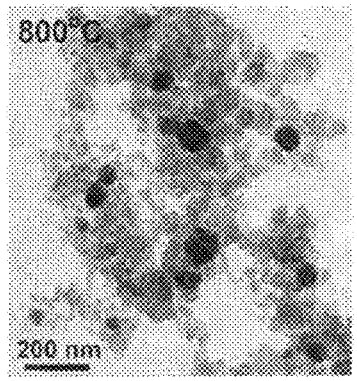
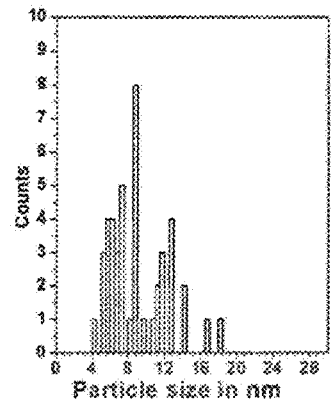  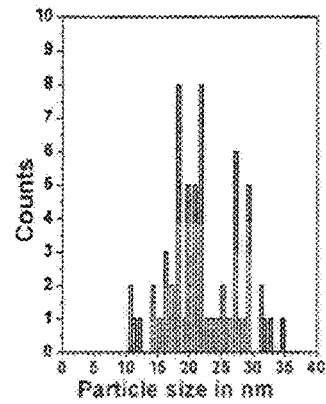  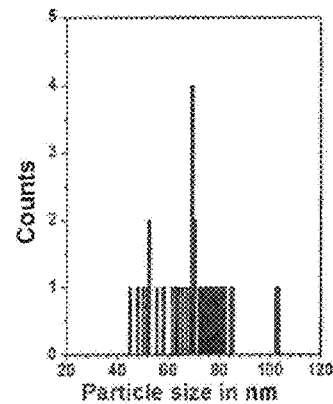
FIG. 15A(2)    FIG. 15B(2)    FIG. 15C(2)

FIG. 18A(1)   FIG. 18A(2)   FIG. 18B(1)   FIG. 18B(2)
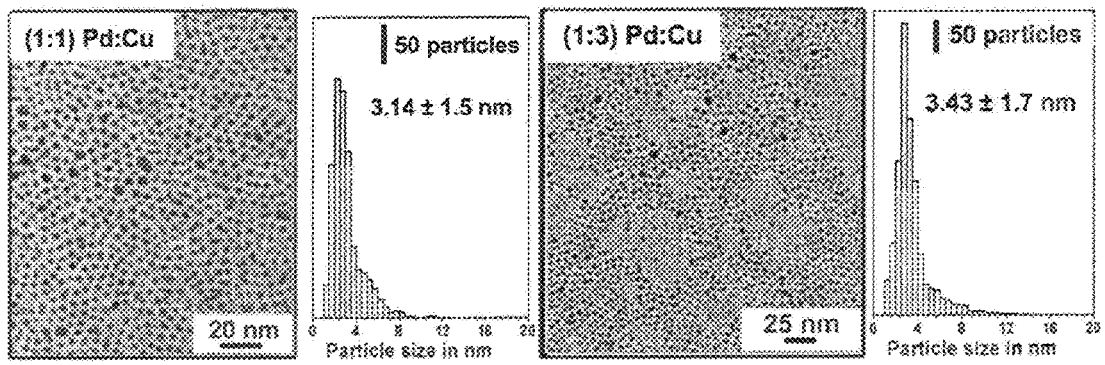

NON-PLATINUM BIMETALLIC POLYMER ELECTROLYTE FUEL CELL CATALYSTS

CROSS REFERENCE TO RELATED PATENT APPLICATIONS

The present application claims priority to U.S. Provisional Patent Application No. 61/062,634, filed Jan. 28, 2008 incorporated herein by reference in its entirety.

STATEMENT OF GOVERNMENT INTEREST

The United States Government has certain rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

FIELD OF THE INVENTION

This invention is directed to a catalyst composed of a non-platinum containing polymetallic alloy. More particularly, the invention is directed to polymetallic alloys of at least one noble metal and at least one base metal. The polymetallic catalyst is prepared such that a catalytically active noble metal is preferentially located near and/or at the surface of alloy particles with the bulk of a given particle being the base metal which operates to alter in a selected manner the electronic properties of the surface noble metal.

BACKGROUND OF THE INVENTION

This section is intended to provide a background or context to the invention that is, inter alia, recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Numerous chemical reactions rely on the use of catalysts to accelerate and control reaction products to achieve commercially useful products, reaction, efficiency, and obtain proper reaction products. For example, catalysts play an important role in polymer electrolyte fuel cell (PEFC) power systems. However, one of the major barriers to the commercialization of PEFC power systems, especially for the automotive application, is cost. The high cost is largely due to the use of platinum-containing electrocatalysts, where the majority of the catalyst is platinum, in the fuel cell electrodes. In the area of polymer electrolyte fuel cell systems the cost of the membrane-electrode assembly system can amount to almost 84% of the total cost of a fuel cell stack and the cost of the anode and cathode are about half that total. While there has been substantial progress recently in reducing the Pt metal loading requirements for the anode and cathode, the cost for the anode and cathode still makes polymer electrolyte fuel cells too expensive for widespread commercial use. The United States Department of Energy has set a target for fuel cell catalyst cost of $5/kW power, with the current status being approximately $25/kW using a platinum cost of $1100/Troy Ounce. Consequently, any further substantial cost reductions, needed to meet the targets for commercial viability, will likely require dramatic improvement of Pt-based catalyst properties or eliminating use of Pt, and using a lower cost metal to improve performance.

Various alternative cathode electrocatalysts for PEFCs, such as non-Pt binary and ternary alloys, early transition metal chalcogenides, macrocycles containing the $MN_4$ moiety, and various transition metal carbides and nitrides have been developed to address this issue.

The Department of Energy has set a goal to achieve a fuel cell cost of $8/kW of power. In addition, the Pt free catalyst must perform at or above Pt activity for oxygen reduction reaction (ORR), and the catalyst must be more stable than Pt in an acidic fuel cell environment. The DOE standards for specific activity, mass activity, volume activity and stability are, respectively, 720 $\mu A/cm^2$, 0.44 A/mg (@900 $mV_{iR-free}$), >130 $A/cm^2$ (@ 800 $mV_{iR-free}$) and 5,000 hours with potential cycling. The currently available Pt based electrocatalyst not only is extremely costly but also falls short of these technical performance requirements by a factor of two to three.

SUMMARY OF THE INVENTION

A nanoparticle based catalyst is provided which employs one or more of a noble metal in combination with one or more of a base metal to reduce the cost of a catalyst that may be used, for example, in fuel cells. Various non-platinum bimetallic alloy electrocatalysts with characteristics similar to Pt cathode electrocatalysts currently used in PEFCs have been developed using the techniques of the present inventions. The systems chosen are base metal-noble metal combinations, where the purpose of the major component, the base metal, is to modify the electronic properties of the minor component, the noble metal. Material selection choices are based, in part, by density functional theory calculations that have shown that a shift of the d-band center of a noble metal layer on the surface of a bulk base metal may be expected to occur as a result of the modification by the base metal, making it more "Pt-like" in its bonding characteristics with the oxygen reduction reaction (ORR) intermediates.

Several such bimetallic combinations consisting of different noble metals and correspondingly appropriate base metals have been identified based on the above considerations. For example, a Pd—Cu bimetallic system may be configured to yield activity levels applicable to commercial fuel cell applications. The Pd to Cu ratio and heat treatment temperature may be varied to alter the electrochemistry and oxygen reduction activity of high surface area Pd—Cu electrocatalysts.

The electronic configuration of the noble metal is advantageously modified by selection of particular base metals, and the noble metal is disposed preferentially at the surface of the underlying base metal substrate, which in an embodiment is a particle. In particular, the base metal is alloyed with a noble metal to influence a d-band center of the noble metal to achieve a similar electronic configuration as the present state-of-the-art oxygen reduction electrocatalyst, $Pt_3Co$. Further, the chemical stability of the noble metal against dissolution under highly acidic conditions is increased by appropriate alloying. The alloy creates a strong tendency for the two metals of the noble metal/base metal to form intermetallic compounds and solid solutions, and for the noble metal to segregate to the surface of these compounds and solutions. Particle size is also controlled to increase active surface area of the bimetallic alloy and disperse the alloy on a high surface area carbon. Various embodiments include, for example, Pd—Cu, Pd—Ni, and Pd—Fe alloy systems. The noble metals and noble/base metal alloys may be deposited on a carbon substrate by co-impregnation of the metal nitrate or chloride form, colloidal deposition, or co-reduction of the metal nitrates or chlorides in solution in the presence of the carbon substrate. After deposition on the carbon substrate, the metals, metal nitrates, or metal chlorides may be heated in a reducing atmosphere to reduce the precursors to metals and promote the formation of intermetallic compounds or solid solutions.

Various compositions of Pd—Cu catalysts supported on Vulcan carbon were prepared by impregnation and subsequent reduction at elevated temperatures (300-800° C.) in a dilute hydrogen atmosphere. Characterization of these catalysts by XRD and TEM-EDX showed that bimetallic alloys had formed. The degree of alloying, metal particle size, and particle composition were strongly dependent on the processing temperature and also varied with the ratio of Pd precursor to Cu precursor. Improved alloying and controllable particle composition achieved at the higher processing temperatures, but with larger metal particle sizes. Formation of a line-compound (PdCu) was evident at approximately 600° C. for the compositions with Pd:Cu molar ratios of 1:3 and 1:1.

The ORR activity obtained from these catalysts varied with the heat treatment temperature and the Pd:Cu precursor ratio, which can be correlated to variations in the degree of alloying, nanoparticle sizes, and bimetallic composition. Overall, the best ORR activity, which was 5 to 6 times higher than that of monometallic Pd catalyst, was shown by the bimetallic compositions treated at 600° C. with Pd:Cu molar ratios of 1:1 and 1:3. XRD analysis showed that a PdCu line compound (ordered phase) was formed in these two compositions. Catalyst preparation methods that offer higher degree of alloy homogeneity with smaller particle size and formation of desired nanostructure and alloy phases at moderate temperatures (e.g., the colloidal technique) may improve ORR activity of the bimetallic catalysts.

Acid treatment of the Pd—Cu catalysts improved the ORR activity of the catalysts due to the removal of unwanted phase such as unalloyed Cu. The leaching of both Pd and Cu from the alloyed Pd—Cu indicates that certain phases of the bimetallic catalyst are not stable in acidic medium. However, after acid treatment, the Pd mass-normalized ORR activities are enhanced, indicating that the most active phases are stable in acid.

These and other features of various embodiments of the present invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 15A(1) illustrates a microstructure of a Pd—Cu metal catalyst prepared by co-impregnation and fired at 300° C.; FIG. 15A(2) shows the resulting particle size distribution; FIG. 15B(1) shows the microstructure of a Pd—Cu catalyst fired at 600° C.; FIG. 15B(2) shows the resulting particle size distribution; FIG. 15C(1) shows the microstructure of the Pd—Cu metal catalyst metal prepared by co-impregnation and fired at 800° C. and FIG. 15C(2) shows the resulting particle size distribution;

FIG. 18(A)(1) shows the microstructure of a Pd—Cu (1:1) alloy in particle form; FIG. 18A(2) illustrates particle size distribution for the Pd—Cu alloy particles of FIG. 18A(1); FIG. 18B(1) shows the microstructure of a Pd—Cu (1:3) alloy in particle form; and FIG. 18B(2) illustrates particle size distribution for the Pd—Cu alloy particles of FIG. 18B(1)

DETAILED DESCRIPTION OF PREFERRED EMBODIMENTS

A Pt free bimetallic catalyst has been prepared based on one or more noble metals alloyed with one or more base metals. The catalyst finds particular use as a polymer fuel cell catalyst in which the electronic configuration of the noble metal is adjusted by establishing a base metal alloy which enhances and/or achieves a desired catalytic activity. The alloy also is formed to preferentially segregate the noble metal at or near a surface region of a particle formed of the alloy. Accordingly, the base metal is primarily confined to regions remote from the surface. Noble metals for use in the catalyst include, for example, Ir, Rh, Pd, and Au. The noble metal is alloyed with a base metal, such as, Cu, Fe, Co, Ni, Zn, Ta, W, Re, and Mo to form a bimetallic. It is also contemplated that one or more noble metals can be alloyed with one or more base metals to form ternary and quaternary compounds of the above-named elements having the desired electronic and chemical properties to meet the requirements for the catalyst.

To achieve the desired catalyst requirements, direct four electron transfers may be accomplished with high electrocatalytic activity (comparable to or greater than Pt), during the $O_2$ reduction (ORR) in acidic media,

| two electron transfer | four electron transfer |
|---|---|
| $O_2 + 2H^+ + 2e^- = H_2O$ | $O_2 + 4H^+ + 4e^- = 2H_2O$ |

Further, the catalyst should be chemically compatible with the acidic polymer electrolyte. For example, the catalyst may be configured such that there is less than about 40 percent electrochemical area loss over 5000 hours of operation at $\leq 80°$ C. and 2,000 hours at greater than 80° C. operation.

Figure 14:
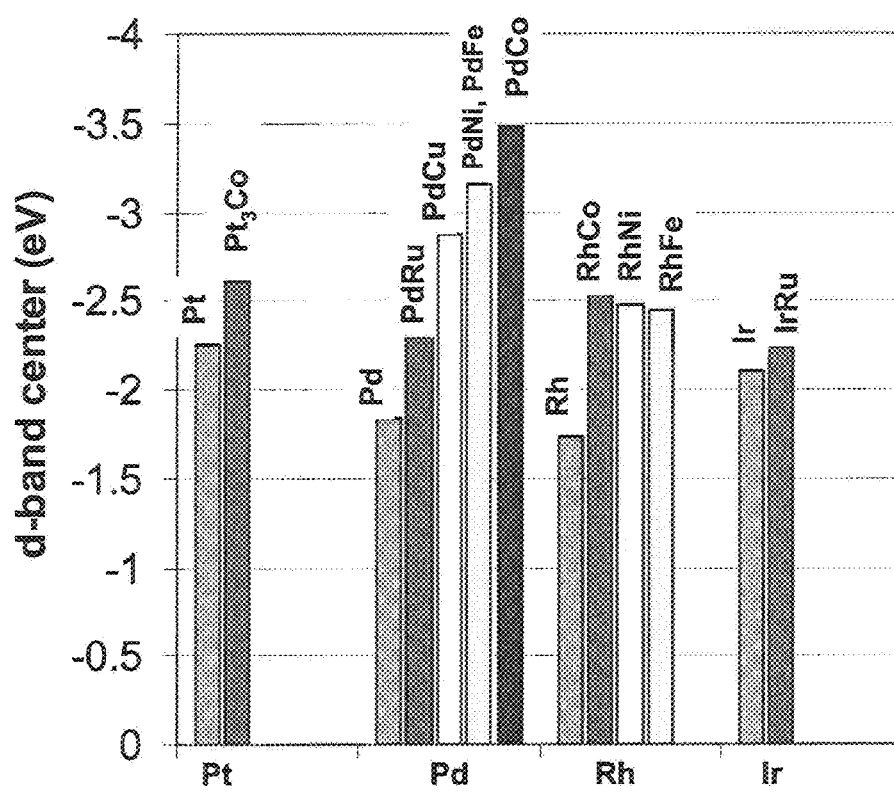
FIG. 14 is a bar chart of the expected d-band centers of the surface-segregated noble metal on a base metal core, as calculated using density functional theory, and the desirable d-band center of $Pt_3Co$.

As shown in FIG. 14, a variety of bimetallic alloys can be formed for each of the noble metals (such as, Pd, Rh and Ir) with the alloy formed such that the noble metal substantially segregates to the surface of the alloy. The base metal, predominantly in the interior of the alloy, modifies the electronic properties of the noble metal shell making them similar to those of Pt. The electronic properties of the metal control, in part, the ability of the metal to catalyze the oxygen reduction reaction. One measure of the suitability of the electronic properties of the metal for this reaction is the metals' d-band center. FIG. 14 is a bar chart of the expected d-band centers of the surface-segregated noble metal on a base metal core, as calculated using density functional theory. Shown for comparison, is the target d-band center of a state-of-the art Pt catalyst.

FIGS. 15A(1)-15A(2) illustrate the microstructure of Pd—Cu metal catalysts prepared by co-impregnation into a high surface area carbon substrate. The small, dark particles are the Pd—Cu nanoparticles, while the lighter carbon serves as the substrate for the alloy particles. The particle size and distribution change noticeably at the different temperatures of treatment. At 800° C. there is a definite trend to a more homogeneous particle distribution, being substantially flat over a size range of 45-85 nm with a larger number of selected particles size.

Figure 16:
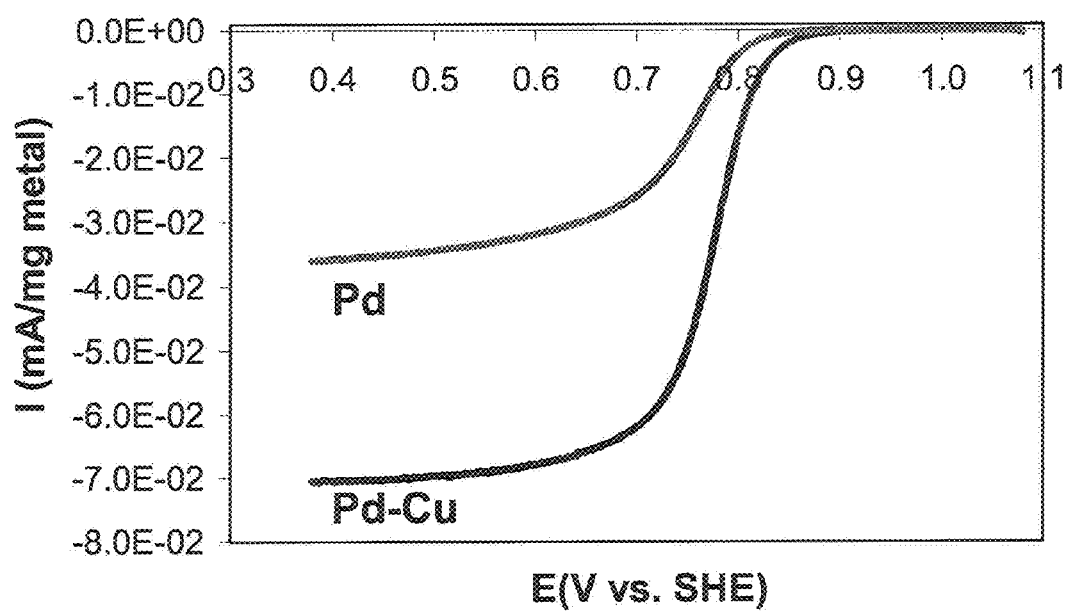
FIG. 16 illustrates the oxygen reduction reaction (ORR) activity of the Pd nanoparticle catalysts as measured by rotating disk electrode experiments.
Figure 17:
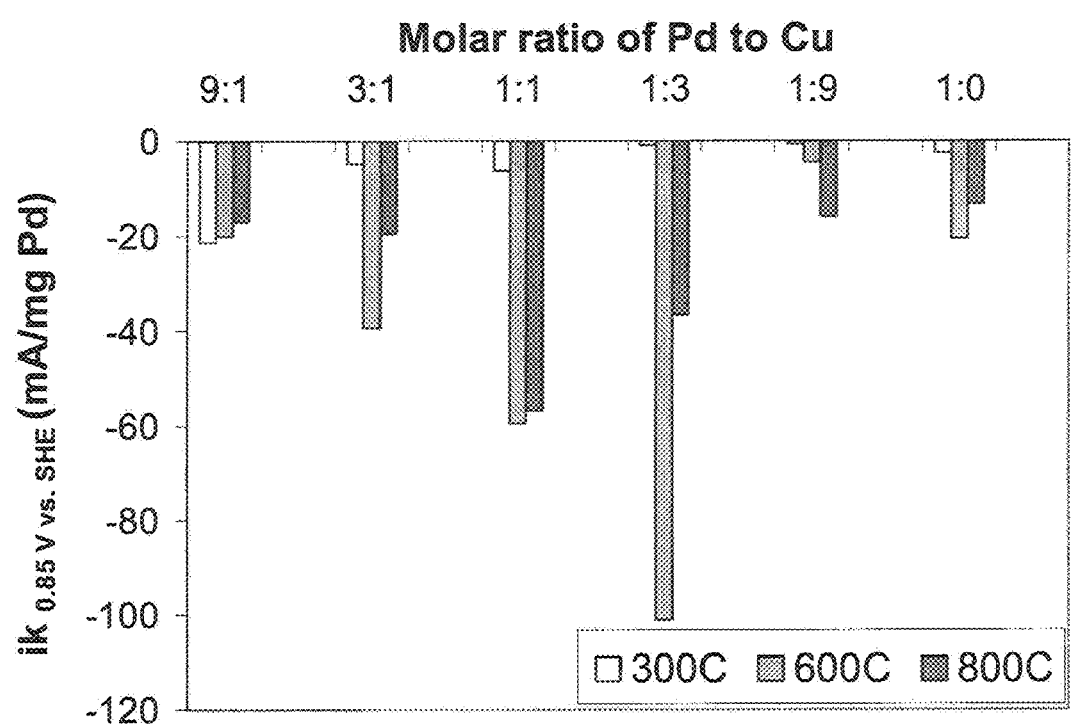
FIG. 17 illustrates the ORR mass activity at 0.85V for various compositions and treatment temperatures.
Figure 19A:
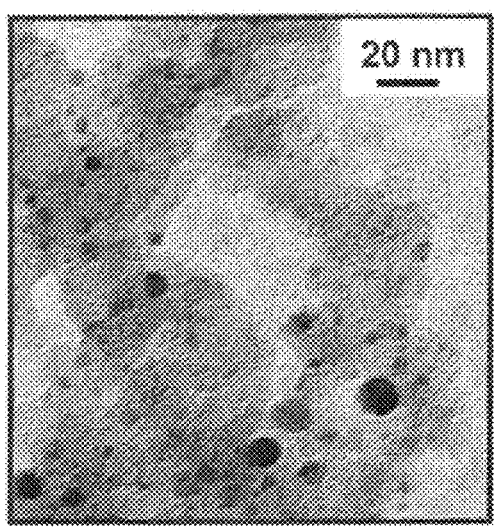
FIG. 19A shows preformed Pd—Cu (1:3) particles, formed using the colloidal technique, loaded onto a carbon support and thermally activated by decomposition.
Figure 19B:
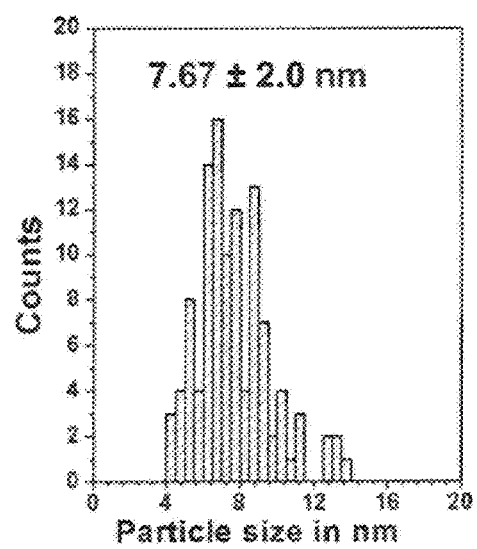
FIG. 19B shows the resulting particle size distribution of FIG. 19A.

The ORR activity is illustrated in FIG. 16 as determined by conventional experiments in oxygen-saturated 0.6 M $HClO_4$. Notably, the Pd—Cu catalyst displays a higher activity than Pd alone. FIG. 17 shows the ORR mass activity at 0.85V for various compositions at different treatment temperatures. The ORR activity is dependent on composition and processing temperature for the catalyst. Throughout, catalysts are denoted by the nominal, as-prepared molar ratio of Pd to Cu (e.g., the catalyst with a nominal Pd to Cu molar ratio of 1 to 3 is referred to as (1:3)Pd:Cu).

These bimetallic alloy nanoparticles can thus be readily controlled to produce different compositions, different particle size, different electronic configurations and different compositional distribution for the noble metal to provide the desired catalytic activity. The alloy nanoparticle may be incorporated in a monolayer of an organic molecular compound or surfactant shell to provide preselected activity and chemical stability. The organic shell can prevent nanoparticle agglomeration or breakdown. In addition, interparticle interactions of the shell molecules confer spatial controllability in the assembly of particles on a substrate or a support material. The surface of the metallic core can also be readily manipulated to obtain the desired morphology of the bimetallic alloy particle. The organic monolayer is subsequently removed to form a catalytically-active surface.

In FIGS. 16A(1)-16B(2), the controllability of Pd—Cu particles is shown for two Pd—Cu alloys: (1:1) and (1:3) with relatively similar particle sizes. For the (1:3) alloy the resulting nanoparticle dispersion on carbon and the particle size distribution are shown in FIG. 17A and FIG. 17B, respectively. The particles were produced by thermally treating in air at 300° C. for two hours and then for another two hours at 400° C. in $H_2$/He. Thermal exposure changes particle size and should be accounted for in a selected commercial application.

The following non-limiting examples are illustrative of methods of manufacture of a bimetallic alloy catalyst.

EXAMPLE 1

Preparation of Pd—Cu Bimetallic Electrocatalysts

Carbon supported Pd—Cu bimetallic catalysts with nominal molar ratios of Pd to Cu ranging from 9:1 to 1:9 as well as Pd alone were prepared by co-impregnation followed by reduction with hydrogen. A palladium nitrate solution (10 wt % $Pd(NO_3)_2$ in 10 wt % $HNO_3$, Sigma-Aldrich) and copper nitrate ($Cu(NO_3)_2 \cdot 2.5H_2O$, Sigma-Aldrich) were used as the metal precursors. For a fixed molar ratio of a Pd—Cu bimetallic composition, a minimal amount of deionized water (Millipore, >18.2 MΩ purity) was used to dissolve the desired amount of copper nitrate, which was then mixed with the required amount of palladium nitrate solution. The solution mixture was impregnated into pre-weighed XC-72R Vulcan Carbon (Cabot). This mixture was then dried at 100° C. overnight. The final catalyst was then formed by heating the impregnated sample in dilute hydrogen in helium (3.67% $H_2$, Linde) at three different temperatures, 300° C., 600° C., and 800° C., respectively, for 2 to 4 hours. The composition of the bimetallic catalysts on the carbon support was determined by inductively-coupled plasma-atomic emission spectroscopy (ICP-AES).

Acid treatment of these catalysts was carried out to examine the stability of the catalysts and to remove possible unwanted phases in the Pd—Cu bimetallic compositions prepared as described above. In this treatment, about 25-50 mg of catalyst was mixed with 1-2 g of 0.6 M $HClO_4$ solution for a minimum of 3 days, with agitation. The catalyst was then filtered from the acid solution, washed with deionized water (>18 MΩ, Millipore), and then dried overnight at 100° C. The acid was collected and analyzed by high-resolution inductively-coupled plasma-mass spectrometry (ICP-MS, Fisons Quadrupole PQII+ICPMS) to determine the concentrations of dissolved metals, which were used to calculate the compositions of the acid-treated catalysts.

Materials Characterization

Temperature programmed reduction (TPR) experiments were carried out using a micro-reactor system (Zeton Altamira, Model AMI-100) and 3.8% hydrogen in argon atmosphere. The TPR experiments were performed on the metal precursor-impregnated Vulcan carbon following removal of the aqueous solvent. The samples included the Pd—Cu bimetallic composition with the highest copper content and a monometallic composition containing only Pd, to determine the temperatures at which both metal precursors supported on carbon were reduced to their metallic forms.

The catalyst powders formed after the heat treatment at 300° C., 600° C., and 800° C. in dilute hydrogen were characterized by X-ray diffraction (XRD, Siemens D5000, Cu Kα) by scanning between 5° and 80° 2θ at a rate of 0.25° 2θ/min. The size and morphology of the catalyst particles were analyzed using transmission electron microscopy (TEM, Philips CM30T, 200 kV). This TEM is equipped with an Energy-Dispersive X-Ray analyzer (EDX), which was also used to determine the catalyst particle composition. Carbon-loaded nanoparticle samples were made into dilute suspensions in isopropanol and then drop-cast onto a carbon-coated gold grid, followed by solvent evaporation in air at room temperature, leaving the catalyst on the carbon-coated TEM grid.

Electrochemical Characterization

For both the as-prepared and the acid-treated catalysts, inks were made by mixing the catalyst powder, NAFION® solution (5 wt % solution in a mixture of lower aliphatic alcohols and water, Sigma-Aldrich), and methanol. The amount of the NAFION® solution added yielded a volume ratio of 50:50 of dry NAFION to catalyst. An aliquot of 0.5 μL of ink was then applied to a glassy carbon rotating disk electrode (RDE, Pine Instruments Co., geometric area=0.196 cm$^2$) and air-dried at room temperature to form a thin-film RDE. The amount of the catalyst deposited on the glassy carbon electrode was determined by weighing 3-5 aliquots of 0.5 μL of the catalyst ink, ranging from 15 to 80 μg/cm$^2$.

Cyclic Voltammograms (CVs) of the catalysts thin-film RDE, with and without rotation, were measured separately in the deaerated and $O_2$-saturated 0.6 M $HClO_4$ electrolyte solution, using a CHI 660A Electrochemical Workstation (CH Instruments, Inc.). This concentration of perchloric acid was chosen to mimic the acidity of the PEFC membrane electrolyte. The perchloric acid electrolyte was prepared from 70% $HClO_4$ (GFS Chemical, Inc., veritas double-distilled) and deionized water (>18 MΩ, Millipore). The counter electrode was gold wire located in a separate fritted compartment. The reference was a $Hg/Hg_2SO_4$ electrode with a filling solution of 0.5 M $H_2SO_4$. Both the Ar (for deaeration) and $O_2$ gases used were ultra-high purity (99.999% Ar, 99.99% $O_2$, Linde). The steady-state CVs were obtained by rotating the thin-film RDE at various rates, using an electrode rotator (Pine Instruments Co., AFMSRX). The values of potentials provided herein are referenced to the standard hydrogen electrode (SHE). All electrochemical experiments were performed at room temperature (about 22° C.).

Characterization of Catalysts

Temperature programmed reduction (TPR) experiments were performed on the dried metal nitrate-impregnated Vulcan carbon to determine the temperatures at which the Pd and Cu precursors are reduced to the corresponding metal. Two representative compositions were chosen for TPR analysis: the one containing the highest Cu content, (1:9)Pd:Cu, and the one containing only Pd. These two catalysts are expected to be the easiest (Pd) and the most difficult ((1:9)Pd:Cu) to reduce to metallic form among all the impregnated samples. The reduction of the metal precursors in the rest of the bimetallic compositions is thus expected to occur within the temperature range observed for the Pd alone and (1:9)Pd:Cu compositions.

Figure 1:
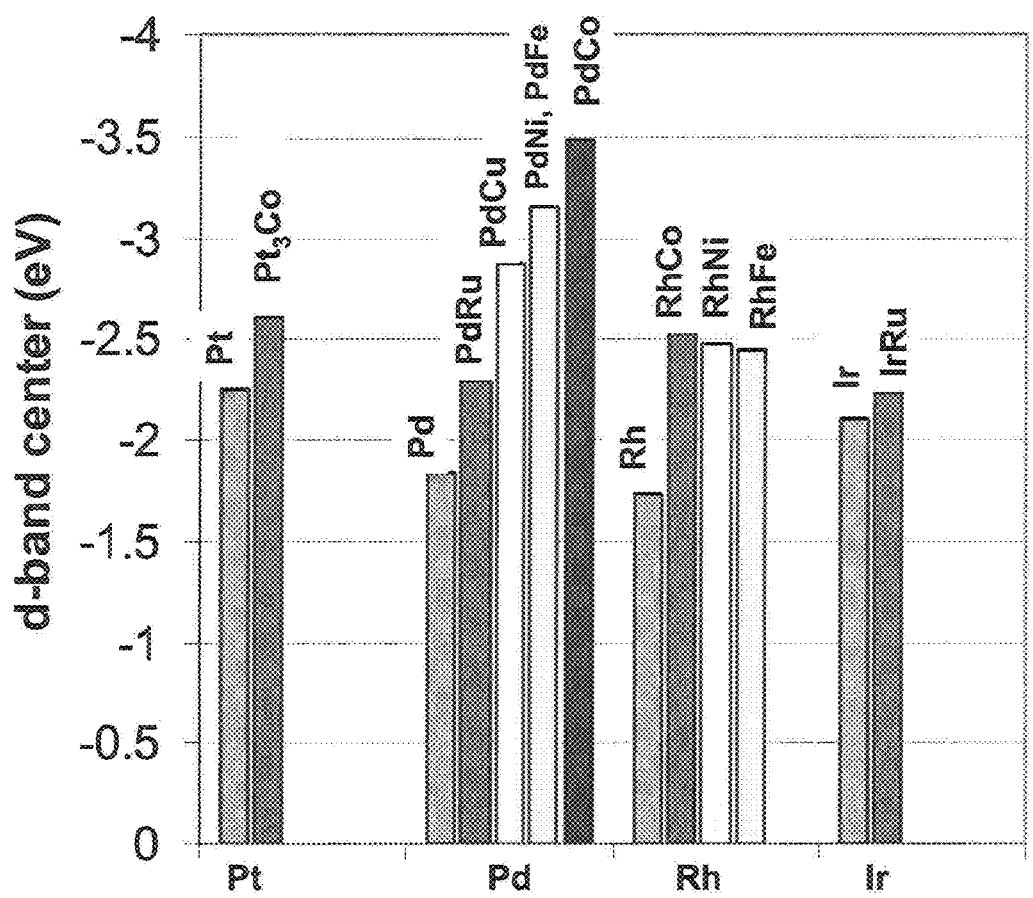
FIG. 1 shows a temperature programmed reduction profile for Pd (x) and Pd—Cu (◊) precursors impregnated on Vulcan XC-72R after drying at 100° C. in an atmosphere of 3.8% $H_2$ in He.

FIG. 1 shows the TPR profile for the sample (1:9)Pd:Cu/C in comparison with that for Pd/C alone. The TPR profile of Pd/C showed a reduction peak at 142° C. with a shoulder before the peak in the temperature range of 67 to 129° C., indicating the reduction of the Pd species begins at about 67° C. and peaks at 142° C. Whereas the bimetallic sample (1:9) Pd:Cu/C showed a similar TPR profile at temperatures lower than 180° C., but with a positive temperature shift, indicated by a reduction peak at 167° C. and a shoulder in the temperature range of 100° C. to 140° C., associated with the reduction of Pd species. This positive temperature shift indicates the stabilizing effect of the presence of Cu for Pd precursor reduction, which can be attributed to the interaction between the Pd precursor and the Cu species (e.g., formation of a mixed oxide, CuOx-PdO). However, two additional reduction peaks were observed that occurred at higher temperatures, 219° C. and 240° C., respectively, associated with the reduction of the Cu species on the support.

FIG. 1 shows that both metal precursors in the bimetallic compositions of Pd—Cu should be completely reduced to the metallic state by dilute hydrogen at temperatures higher than 250° C. Therefore, three temperatures, 300° C., 600° C., and 800° C., were chosen for the heat treatment of the as-deposited catalyst in reducing atmosphere (3.67% $H_2$ in He). Heat treatment temperatures higher than the minimum reduction temperature were used to promote alloy formation between the metallic Pd and Cu.

The metal loading of the catalysts was determined by ICP-AES. Table I shows the nominal and experimentally determined palladium-to-copper ratios. For the different Pd—Cu bimetallic compositions prepared, the total moles of metal (Pd+Cu) loaded on the support were kept constant; therefore, the weight loading of both metals varied with the change in the molar ratio Pd:Cu.

TABLE I

Nominal catalyst compositions and catalyst compositions as determined by ICP-AES

| Sample name | Nominal | | Composition as determined by ICP-AES | | | |
|---|---|---|---|---|---|---|
| | Pd at % | Cu at % | Pd at % | Cu at % | Pd wt % | Cu wt % |
| (9:1)Pd:Cu | 90 | 10 | 90.0 | 10.0 | 20.3 | 1.35 |
| (3:1)Pd:Cu | 75 | 25 | 74.9 | 25.1 | 16.3 | 3.27 |
| (1:1)Pd:Cu | 50 | 50 | 49.1 | 50.9 | 10.6 | 6.57 |
| (1:3)Pd:Cu | 25 | 75 | 24.8 | 75.2 | 5.23 | 9.46 |
| (1:9)Pd:Cu | 10 | 90 | 9.5 | 90.5 | 1.96 | 11.2 |
| (1:0)Pd:Cu | 100 | 0 | 100.0 | 0.0 | 7.52 | 0.0 |

Figure 2:
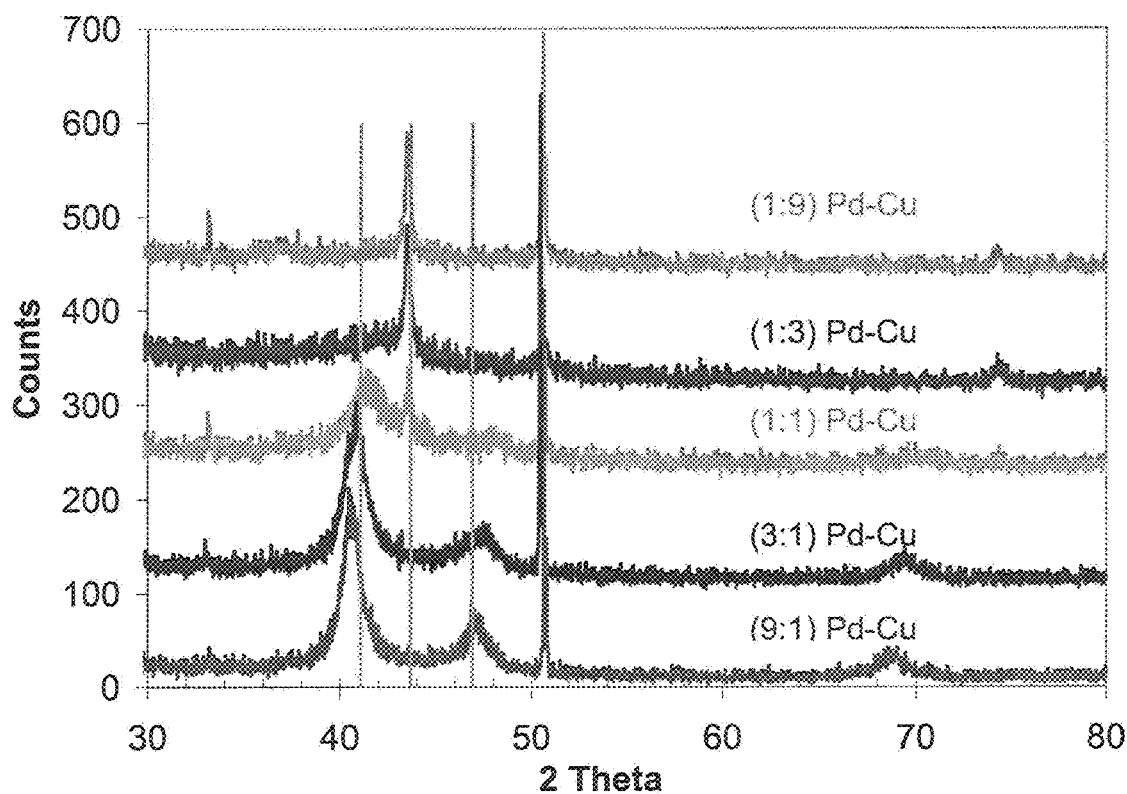
FIG. 2 shows X-ray diffraction patterns of the carbon-supported Pd—Cu catalysts. Catalysts prepared by co-impregnation followed by heat treatment at 300° C. in 3.67% $H_2$ in He for 2 h.
Figure 3:
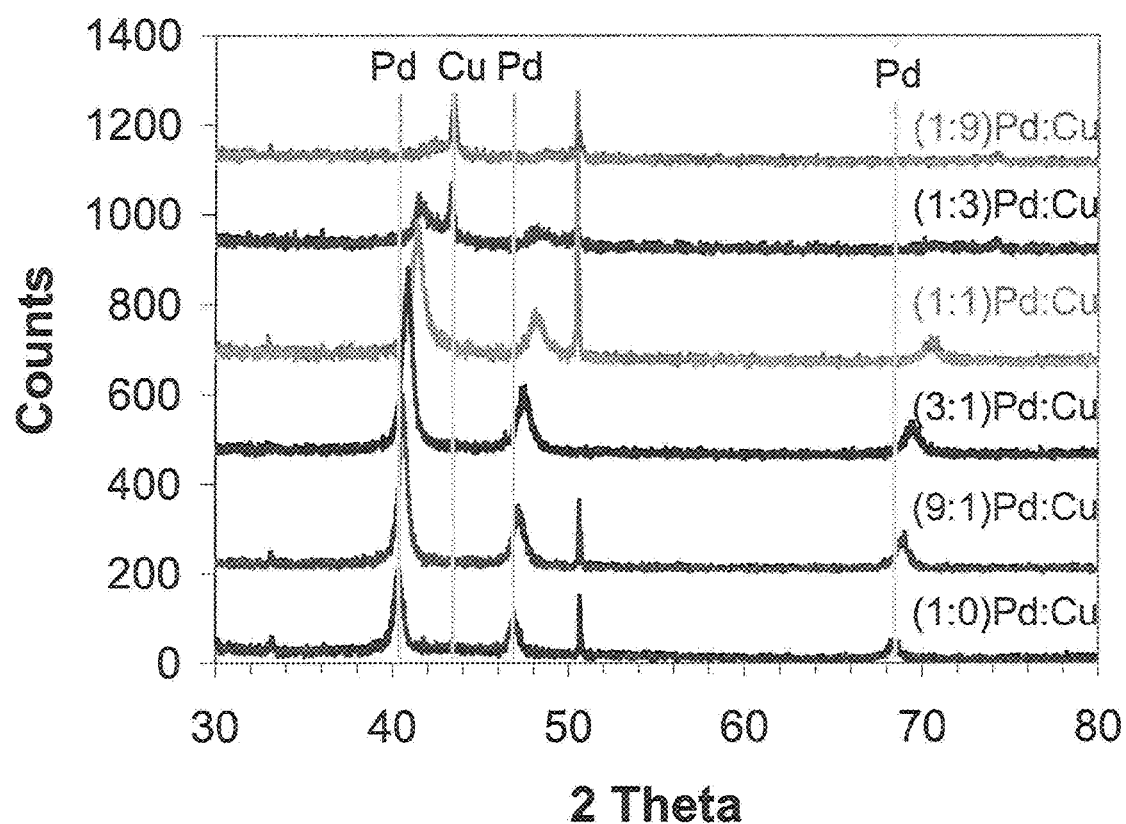
FIG. 3 shows X-ray diffraction patterns of the carbon-supported Pd—Cu catalysts. Catalysts prepared by co-impregnation followed by heat treatment at 600° C. in 3.67% $H_2$ in He for 4 h.
Figure 4:
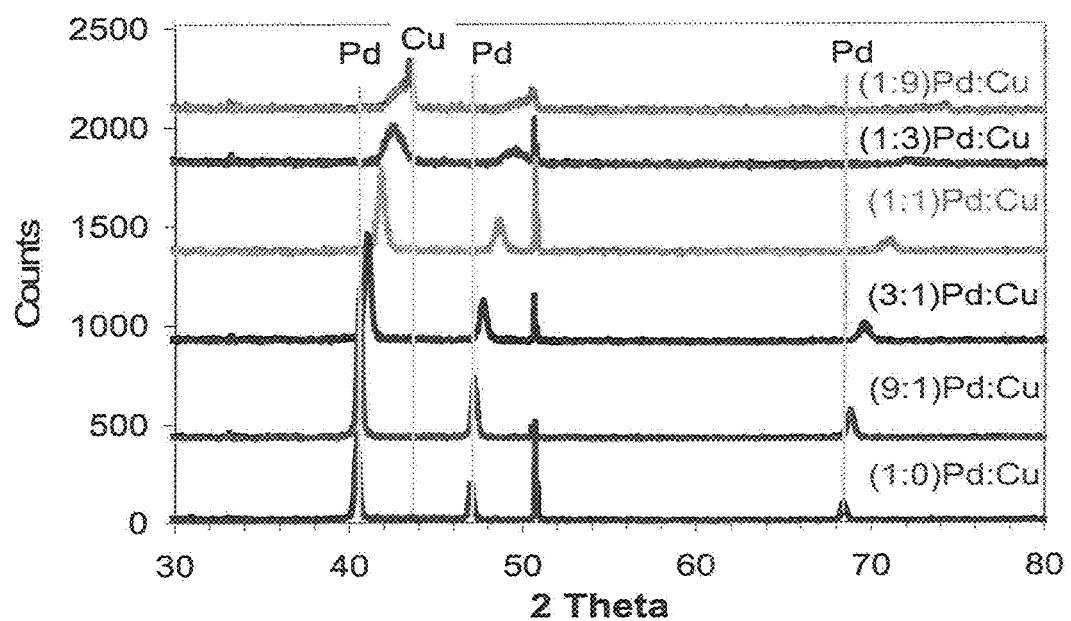
FIG. 4 shows X-ray diffraction patterns of the carbon-supported Pd—Cu catalysts. Catalysts prepared by co-impregnation followed by heat treatment at 800° C. in 3.67% $H_2$ in He for 4 h.

FIGS. 2-4 show the XRD spectra for the catalysts after heat treatment in reducing atmosphere at 300° C., 600° C., and 800° C., respectively. The sharp peak at 50.45° in each of these figures is due to the quartz sample holder. At all three heat treatment temperatures, all compositions of the bimetallic catalyst showed a shift of the Pd peaks to a higher 2θ value, compared to the Pd monometallic catalyst supported on carbon. This gradual shift in the Pd peak position indicates alloy formation between the two metals. Additionally, a comparison of the XRD spectra indicates that metallic Cu (main peak at 2θ=43.4°) emerges at compositions above 50 at % Cu for the 300° C. heat treatment, at 75 at % Cu and higher for the 600° C. heat treatment, and only at 90 at % Cu for the 800° C. heat treatment. The higher heat treatment temperature also yielded XRD peaks that are narrower and higher in peak intensity. These results show that Cu has a higher solubility in the Pd lattice at higher temperatures for a given bimetallic composition. The sharpness of the XRD peaks also indicates that the alloys formed at high temperatures are more crystalline or have large particle sizes than those formed at lower temperatures.

Figure 5:
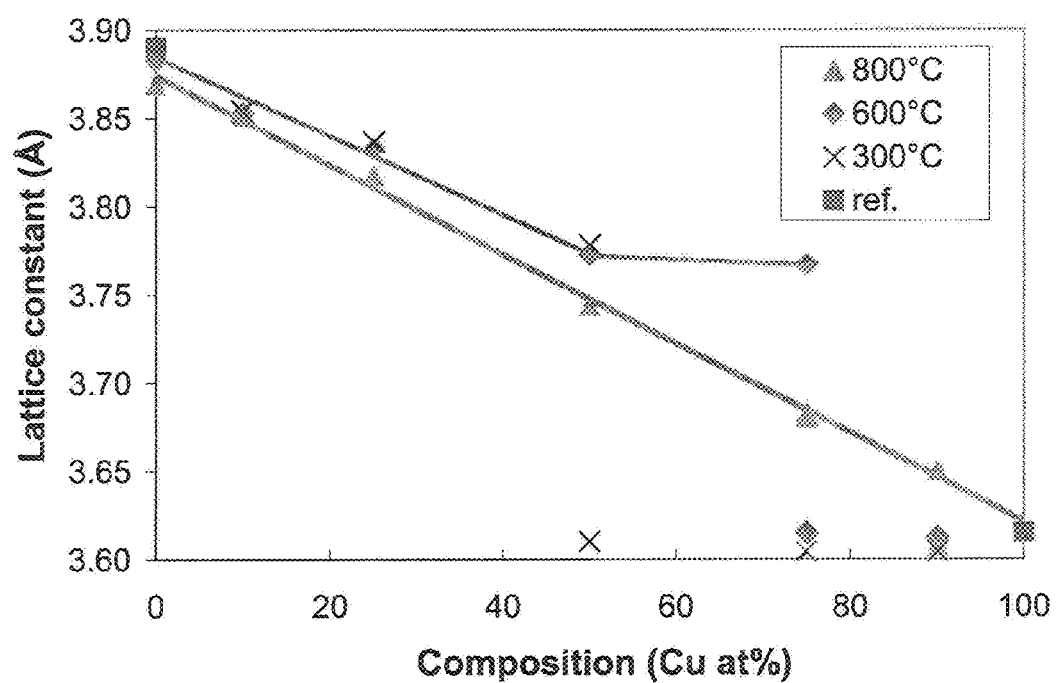
FIG. 5 shows a variation of the lattice constant as a function of composition of the Pd—Cu/C catalysts treated in 3.67% $H_2$ in He at three different temperatures.

Based on the XRD peak positions shown in Figures, the cubic lattice constants of the supported monometallic Pd and bimetallic Pd—Cu catalysts were calculated, using a metallic Pd structure starting model (fcc lattice). The results are shown in FIG. 5. The lattice constants of the isostructural Cu and Pd metals are shown in the figure as reference points. For the catalysts treated at the highest temperature (800° C.), the lattice constant decreases linearly with increasing atomic percentage of Cu in the catalysts, in agreement with their relative atomic sizes and Vegard's Law. This indicates that solid solutions were formed between Pd and Cu throughout the whole concentration range at 800° C. This observation is consistent with the Pd—Cu binary phase diagram that indicates a continuous solid solution between Cu and Pd forms at temperatures above 600° C. For the catalyst materials containing the highest Cu content (90 at % Cu), extra peaks in the XRD spectrum matching Cu metal were visible. Thus, with the catalyst preparation conditions described herein, in addition to the formation of solid solutions (or alloys), unalloyed copper was also present in the (1:9)Pd:Cu. This indicates either incomplete solid solution formation or that equilibrium was not established during the heat treatment time. For the catalysts with Cu content up to 50 at % and treated at the lower temperatures (300° C. and 600° C.), the linear decrease of lattice constant with the increase of Cu content indicates that the Pd—Cu solid solution is formed and contains less than the nominal amount of Cu. Unalloyed Cu metal starts to appear in the catalysts at 50 at % Cu or higher and co-exists with the alloy phase. In fact, for the two samples annealed at the lower temperatures, the unalloyed Cu phase can be seen at much lower total Cu contents. Notably, for the catalyst treated at 600° C., the value of the alloy lattice constant plateaued as the Cu content in the catalyst increased from 50 to 75 at %. The unchanged lattice constant with increasing Cu content indicates that a line compound is formed between Pd and Cu. This is in agreement with the published binary phase diagram of the Pd—Cu alloy system, where at temperatures $\leq$598° C., the formation of the ordered phase PdCu has been indicated. However, here the phase has an fcc lattice rather than the bcc lattice previously observed.

Figure 6:
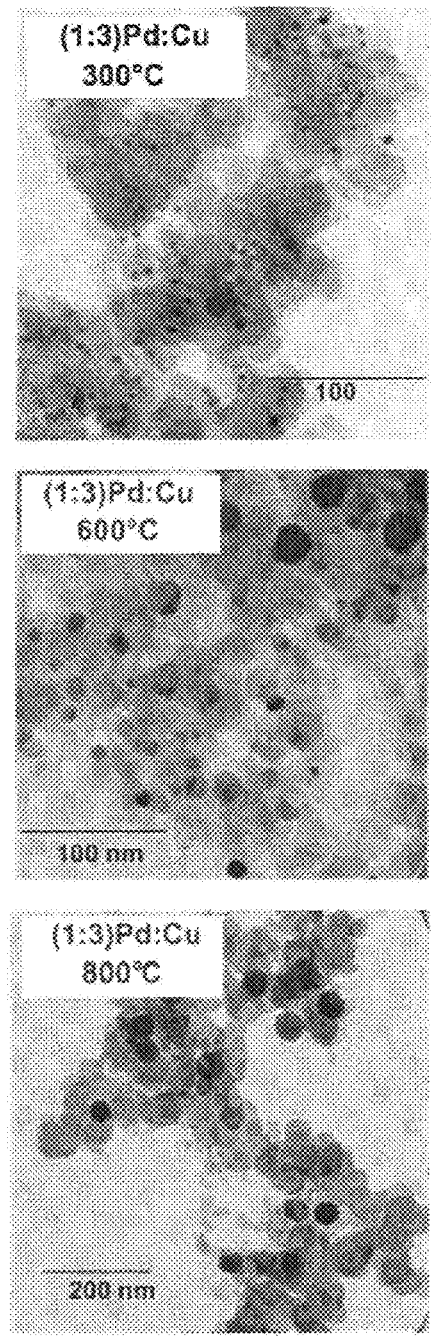
FIG. 6 shows a transmission electron microscopy images for selected Pd—Cu/C bimetallic catalysts.

Transmission electron microscopy and EDX were used to characterize the particle size, morphology, and composition of particles for various compositions of Pd—Cu/C catalysts treated at different temperatures. FIG. 6 shows a representative set of TEM micrographs for the (1:3)Pd:Cu catalysts heat-treated at 300° C., 600° C., and 800° C. The metal nanoparticles exhibited highly faceted nanocrystalline features, observable at high magnifications. The size distributions were determined from an analysis of at least 50 particles in the TEM images (by tracing the particles and applying Gatan Digital Micrograph software). Table II summarizes the particle size and size distribution for various catalysts treated at different temperatures. It is evident that the particle sizes of the catalysts treated at relatively lower temperatures are controlled, with moderate size and monodispersity. However, higher heat treatment temperature yielded larger particle sizes and a wider size distribution for a fixed catalyst composition. For example, the (1:1)Pd—Cu/C treated at 600 and 800° C. showed average particle sizes of more than three and ten times those observed in the sample treated at 300° C. In addition, the particle size standard deviations were greater than two and six times, respectively, of the catalyst treated at 300° C.

TABLE II

Particle sizes of the bimetallic Pd—Cu catalysts treated in dilute hydrogen in helium at the temperatures indicated

| | Particle size (nm) | | |
|---|---|---|---|
| Samples | 300° C. | 600° C. | 800° C. |
| (1:9)Pd:Cu (90% Cu) | 10.7 ± 2.1 | 17.2 ± 3.3 | 46.3 ± 11.2 |
| (1:3)Pd:Cu (75% Cu) | 8.1 ± 2.8 | 23.3 ± 8.3 | 55.0 ± 14.5 |
| (1:1)Pd:Cu (50% Cu) | 6.1 ± 1.6 | 21.0 ± 5.1 | 69.9 ± 18.1 |
| (3:1)Pd:Cu (25% Cu) | 9.1 ± 3.3 | 21.8 ± 5.5 | 68.3 ± 10.7 |
| (9:1)Pd:Cu (10% Cu) | 6.5 ± 1.8 | 21.9 ± 4.9 | 73.5 ± 15.4 |

The compositions of the various carbon-supported Pd—Cu catalysts particles were examined by EDX analysis of multiple spots (ranging from 10 to 30) consisting of both individual and groups of particles. The results are shown in Table III. Notable, all the particles in the catalysts that were analyzed were found to have both Pd and Cu, indicating alloy formation between the two metals, consistent with XRD observations. Further, the compositions of different individual catalyst nanoparticles varied widely, clearly indicating poor homogeneity in the composition of the alloy nanoparticles. In fact, a bimodal distribution in the composition was observed for both (1:9)Pd:Cu and (1:3)Pd:Cu treated at 300° C. Still further, the trend for the total metal content in the nanoparticles, as determined by EDX, is similar to the trend in the catalysts' chemical composition as determined by ICP-AES. That is, as the Pd concentration in the catalysts increases, the Pd concentration in the nanoparticles increases for all processing temperatures. The variation of Cu concentration also followed similar trends. Fourth, the composition of the catalyst nanoparticles generally differed from the nominal composition of the catalysts. Specifically, the biggest difference between the nanoparticles' composition and chemical composition was shown by the catalysts that contained high Cu content (>50 at %) and were treated at relatively low temperatures. This difference becomes smaller as the heat treatment temperature increases or as the Cu content decreases. The smallest discrepancies occurred for catalysts with a low Cu content ($\leq$25 at %), independent of the heat treatment temperature.

TABLE III

Composition of the nanoparticles by EDX for various bimetallic Pd—Cu catalysts heat treated in dilute hydrogen at the temperatures indicated

| | Nanoparticle Composition (at % Cu) | | |
|---|---|---|---|
| Samples (at % Cu) | 300° C. | 600° C. | 800° C. |
| (1:9)Pd:Cu (90) | 46.9 ± 6.2<br>86.2 ± 5.7 | 61.5 ± 7.9 | 83.5 ± 7.2 |
| (1:3)Pd:Cu (75) | 36.4 ± 7.4<br>77.1 ± 7.0 | 47.5 ± 10.7 | 67.5 ± 8.9 |
| (1:1)Pd:Cu (50) | 36.7 ± 9.8 | 44.6 ± 12.0 | 54.1 ± 10.1 |
| (3:1)Pd:Cu (25) | 25.5 ± 7.8 | 24.9 ± 7.6 | 33.1 ± 7.7 |
| (9:1)Pd:Cu (10) | 13.5 ± 6.5 | 12.3 ± 5.2 | 12.8 ± 4.0 |

It is apparent from the above observations that the composition of the alloy nanoparticles depends on both the ratio of the amount of palladium precursor to copper precursor used in the synthesis and the post-deposition processing conditions (such as temperature, atmosphere, and time). The observed inhomogeneity in the composition of the alloy nanoparticles may be partly attributed to the limitation of the impregnation deposition technique, which may have led to poor mixing of the two metal precursors. However, more importantly, both the kinetics of the reduction of the two metal precursors and of alloy formation plays a key role, which is affected by the starting composition of catalyst and the heat treatment conditions. The reduction reaction of the metal precursors and metal atom inter-/intra-diffusion for alloy formation may occur at a higher rate at a higher temperature and with a relatively low concentration of one metal in a catalyst. Thus, higher processing temperatures and/or a lower Cu to Pd ratio produced a catalyst with a better match between the composition of the alloy nanoparticles and the overall chemical composition. However, higher processing temperature produced catalysts with relatively large alloy nanoparticles and with wide particle size distribution, due to lack of control of the kinetics of nanoparticle formation.

Electrochemical Characterization

Figure 7:
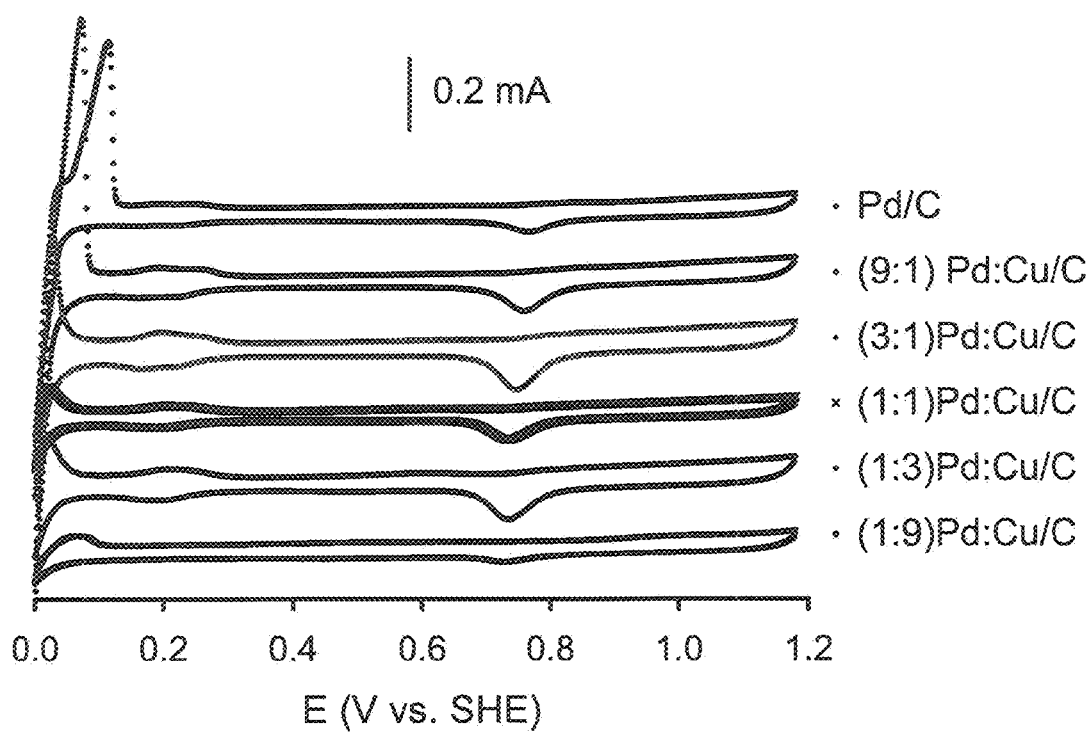
FIG. 7 shows cyclic voltammograms for various compositions of the Pd—Cu catalysts after heat treatment in 3.67% $H_2$ in He at 600° C. and CVs taken in deaerated 0.6M HClO4 at 10 mV s$^{-1}$.

The electrochemical characterization of the bimetallic catalysts was carried out first by measuring cyclic voltammograms (CVs) of each catalyst in a deaerated 0.6M $HClO_4$ aqueous electrolyte with and without electrode rotation. FIG. 7 shows, as typical examples, a set of CVs obtained in the deaerated electrolyte for various bimetallic catalyst compositions treated at 600° C. For reference, the CV from the monometallic Pd catalyst (Pd/C) is also shown in FIG. 7. The redox features of the Pd/C electrode are found to be consistent with CVs taken under similar conditions. The voltammetric features in the 0.64 to 1.2 V range can be attributed to the formation and reduction of Pd oxide. For the adsorption of hydrogen on Pd, it was generally observed to proceed in two steps, first hydrogen is adsorbed on the surface and then the hydrogen atoms diffuse into the bulk, forming Pd hydrides. The 0.14 to 0.33 V region corresponds to the adsorption/desorption of hydrogen and hydrogen absorbed in the α Pd hydride phase on the Pd surface. A large peak appeared at more negative potentials, with a peak potential of 0.116 V, which exhibited behavior typical of a surface process, as the current was unaffected by electrode rotation. This significant peak can thus be attributed to the desorption of hydrogen from the β-phase Pd hydride.

Comparing the CVs obtained from various compositions of Pd—Cu bimetallic catalysts to that from Pd/C, it is observed that most of the bimetallic catalysts maintained the Pd redox features, except for the (1:9)Pd:Cu catalyst, for which the Pd redox features were significantly reduced. Variations of the Pd redox features with the catalyst composition were also observed among those compositions that retained the Pd redox features. As the Cu content was increased, i.e., the Pd to Cu ratio decreased, the hydrogen desorption peak from β-$PdH_x$ shifted to more negative potentials and its peak current decreased, although the hydrogen surface adsorption/desorption properties in the 0.14 to 0.33 V region remained virtually the same. In addition, the reduction of PdOx shifted to lower potentials at a higher Cu content. These variations reflect the effect of alloy formation between Cu and Pd or the presence of Cu. The formation of palladium hydride was suppressed as Pd was alloyed with Au or Ti, due to the reduced stability of the β-phase PdHx in the presence of the alloying metal. In certain cases, there was no palladium hydride formation at all. For example, no β-phase $PdH_x$ was formed for a gold concentration higher than 17 at % for Au—Pd and for a well-ordered Pd—Zn alloy.

Figure 8:
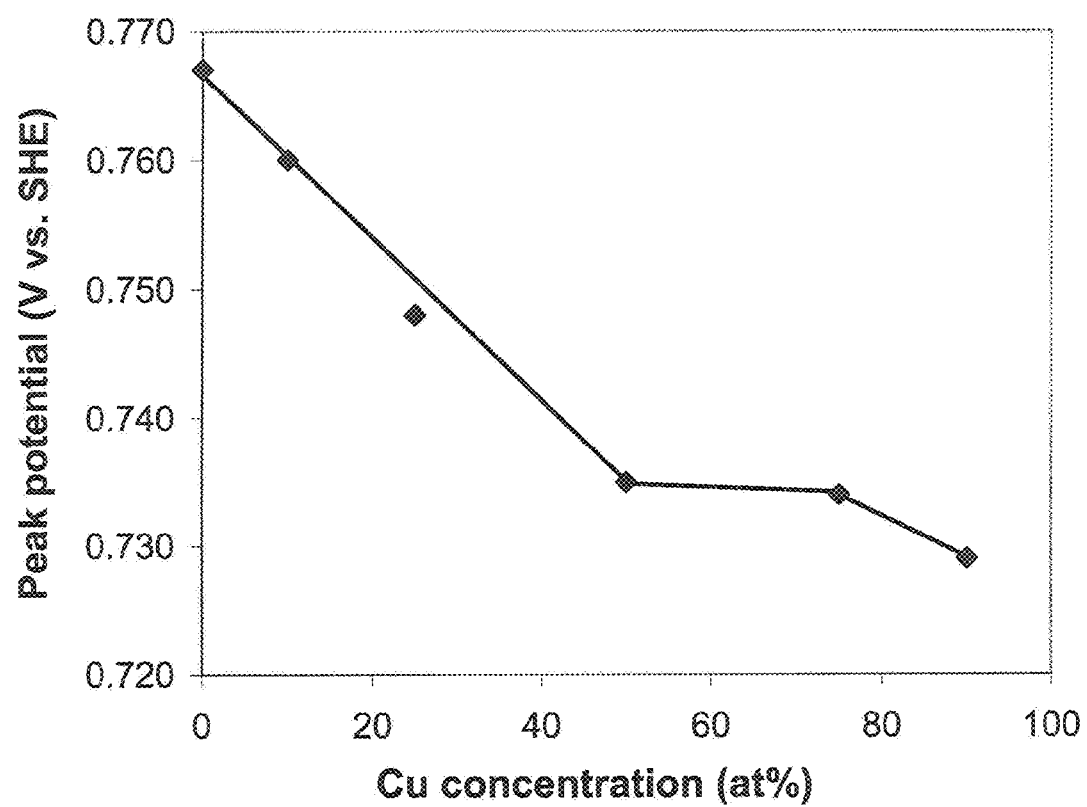
FIG. 8 shows the peak potential for the reduction of $PdO_x$ as a function of the composition of the Pd—Cu/C catalysts.

Interestingly, when the peak potential for the $PdO_x$ reduction was plotted as a function of the chemical composition of the catalysts, as shown in FIG. 8, the variation corresponds with the variation of the lattice constant with catalyst composition, as shown by the diamond symbols in FIG. 5. This further demonstrates existence of the same alloyed phase in the (1:1)Pd:Cu and (1:3)Pd:Cu catalysts, consistent with the statistically identical alloy nanoparticle compositions as determined by EDX (see Table III). The disappearance of the hydrogen adsorption/desorption features of the Pd surface in the 0.1 to 0.3 V region for the (1:9)Pd:Cu catalyst is most likely due to excess Cu on the electrode surface arising from unalloyed Cu, as observed in the XRD pattern. Even though the (1:3)Pd:Cu catalyst showed, by XRD, unalloyed Cu phase co-existing with the bimetallic alloy, it is evident that hydrogen adsorption/desorption features in the 0.1 to 0.3 V region are not different from those for Pd-rich catalysts in which no unalloyed Cu phase was observed (e.g., (9:1)Pd:Cu and (3:1) Pd:Cu). The (1:1)Pd:Cu catalyst showed similar behavior.

Figure 9:
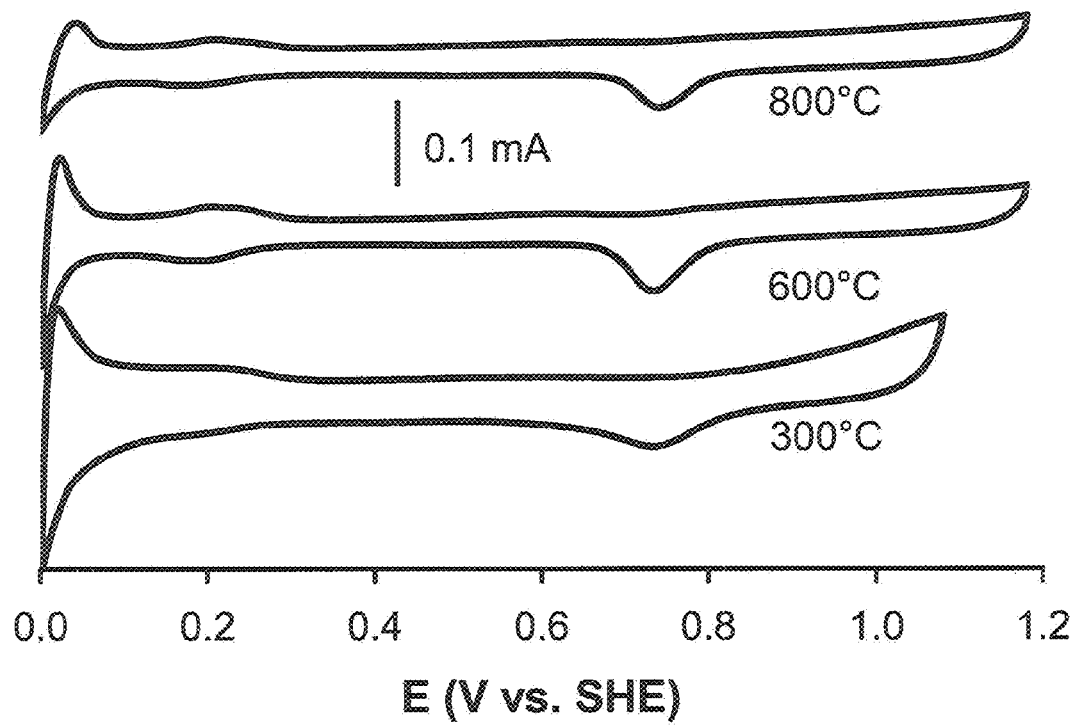
FIG. 9 shows cyclic voltammograms of the (1:1) Pd:Cu/C catalyst heat-treated at three different temperatures, taken in deaerated 0.6M $HClO_4$ at 10 mV s$^{-1}$.
Figure 10:
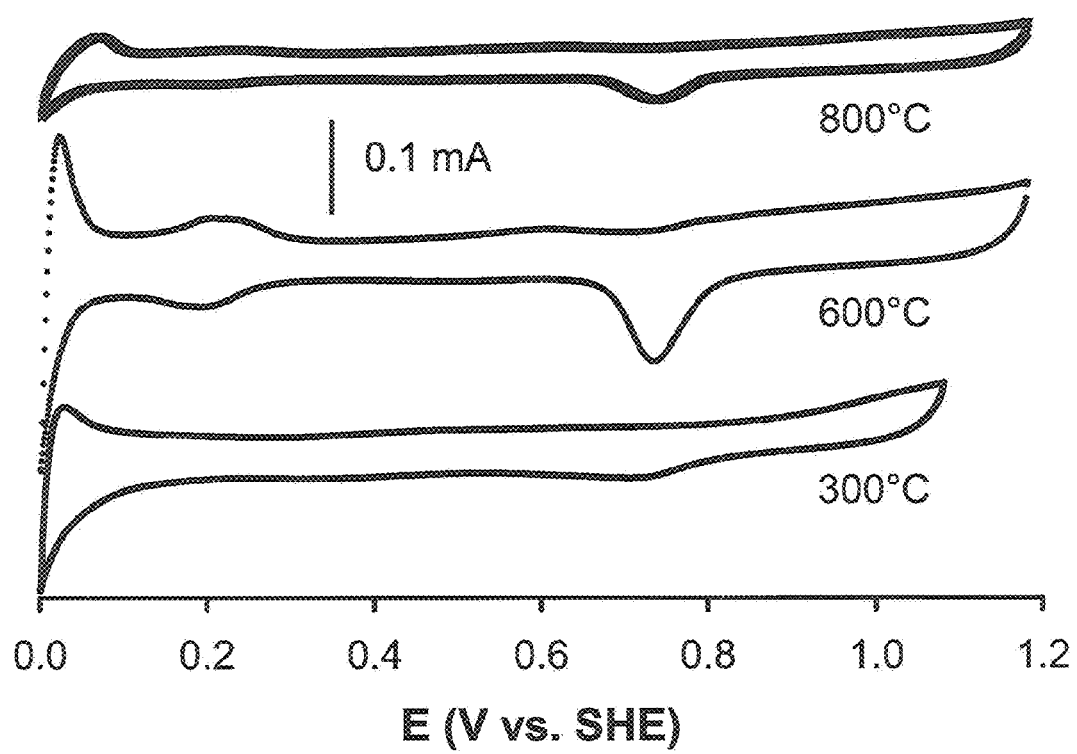
FIG. 10 shows cyclic voltammograms of the (1:3) Pd:Cu/C catalyst heat-treated at three different temperatures, taken in deaerated 0.6M $HClO_4$ at 10 mV s$^{-1}$.

FIGS. 9 and 10 compare the CVs for fixed catalyst compositions of (1:1)Pd:Cu and (1:3)Pd:Cu, respectively, treated at different temperatures. Both compositions showed variations in the features of hydrogen adsorption/desorption with varied heat treatment temperatures. The hydrogen adsorption/desorption features of Pd are more pronounced for the catalysts treated at 600° C. than at 300° C. and 800° C. The Pd features for both catalysts treated at 300° C. are suppressed or diminished due to the existence or prevalence of unalloyed Cu in these catalysts. The decreased Pd features for catalysts treated at 800° C. can be attributed to the coarsening of the nanoparticles. For the catalysts treated at 600° C., the similarity of the Pd voltammetric features observed for the (1:3) Pd:Cu catalyst to those of the (1:1)Pd:Cu catalyst, while containing 3 times higher atomic ratio of Cu to Pd, may be attributed to surface enrichment of Pd in this catalyst.

Figure 11A:
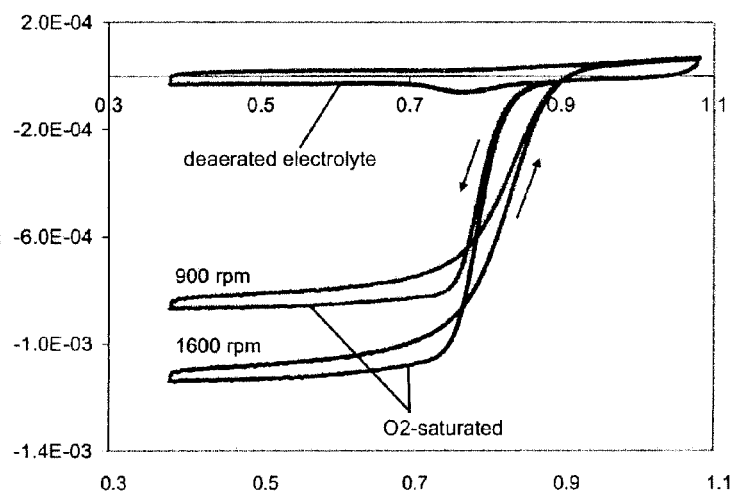
FIG. 11(A) shows steady-state cyclic voltammograms for the (3:1) Pd:Cu catalyst in $O_2$-saturated and deaerated electrolyte at 900 and 1600 rpm.
Figure 11B:
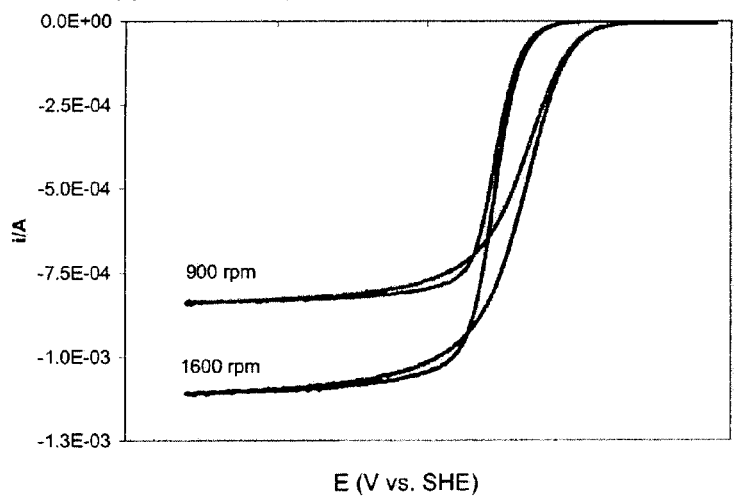
FIG. 11(B) shows net CVs for ORR after background correction.

Various compositions of the bimetallic catalysts were also characterized by measuring CVs in oxygen-saturated electrolyte at various electrode rotation rates in order to determine the ORR activity. The representative steady state CVs obtained for the (3:1)Pd:Cu catalyst rotated at 900 and 1600 rpm in oxygen-saturated and deaerated electrolyte are shown in FIG. 11(A). Also shown in FIG. 11(B) is the net steady-state CVs obtained after correction for the background CVs obtained in the deaerated electrolyte. As seen in FIGS. 11(A) and 11(B), well-defined steady state CVs for the ORR were obtained under these conditions. The displacement of the steady-state CV profile between the anodic- and cathodic-going scans is due to differences in the state of the electrode surface, with the surface being more oxidized during the cathodic-going scan and more reduced during the anodic-going scan.

Figure 12:
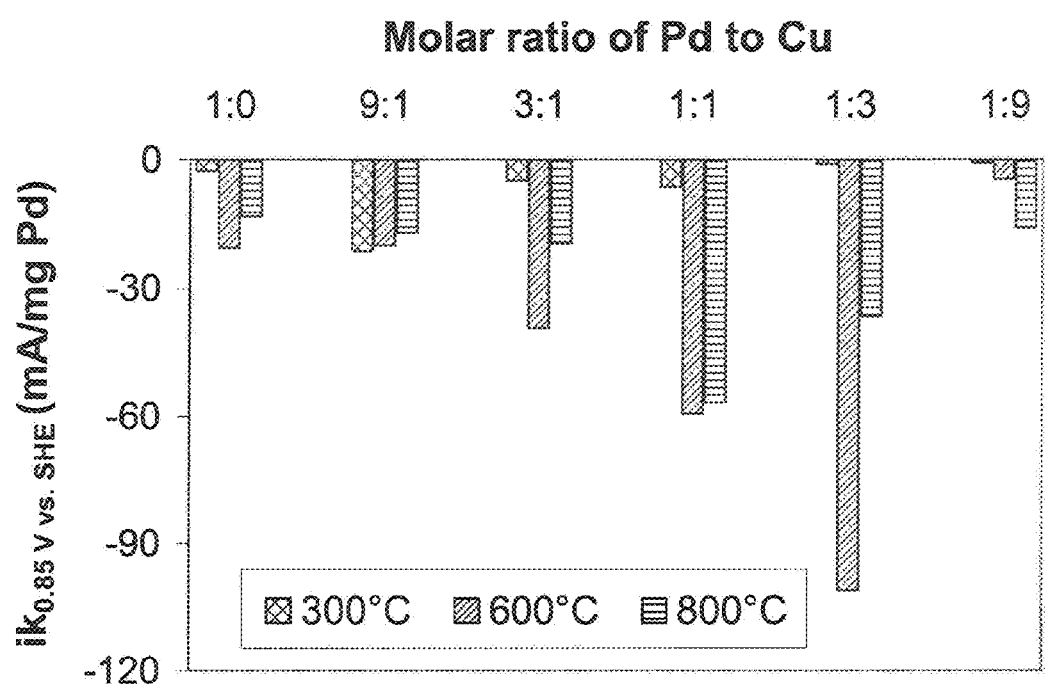
FIG. 12 shows ORR activity, normalized to the weight of Pd, for various compositions of the Pd—Cu catalysts treated at three different temperatures.

Applying the Levich-Koutecky equation to the steady-state CVs obtained from the thin-film RDE, the ORR kinetic current was calculated at several potentials for various Pd—Cu catalyst compositions. FIG. 12 summarizes the ORR activity at 0.85 V for a number of the catalyst compositions and heat treatment temperatures. Note that the ORR activity of a catalyst shown in the figure has been expressed as the kinetic current normalized to the mass of only the noble metal, Pd. As seen from the figure, the ORR activity of the Pd—Cu bimetallic system strongly depends on the molar ratio of the two metals and heat treatment temperature. At the lowest heat treatment temperature, 300° C., the highest ORR activity was exhibited by the catalyst with the highest Pd content (9:1)Pd:Cu/C. However, as the heat treatment temperature increased, this maximum ORR activity was exhibited by the catalysts with lower Pd content: (1:3)Pd:Cu/C catalyst for 600° C. and (1:1) Pd:Cu/C catalyst for 800° C. For a fixed catalyst composition, the 600° C. heat treatment showed the highest ORR activity. The lower mass-normalized ORR activity for the catalysts treated at 800° C. compared to catalysts treated at 600° C. can be attributed to coarsening of the particles at the higher temperature. On the other hand, the lower ORR activity for catalysts treated at 300° C. compared to those treated at 600° C. and 800° C. may be attributed to lower degree of alloy formation. A comparison of the ORR activity for all catalysts revealed that the (1:3)Pd:Cu/C catalyst treated at 600° C. showed the highest ORR activity, followed by (1:1)Pd:Cu/C catalyst treated at both 600° C. and 800° C., which was approximately 4 to 5 times the ORR activity of Pd/C. The bimetallic catalysts that showed the highest ORR activity were those that exhibited identical lattice constant for the alloy phase, indicative of the presence of an ordered phase between Pd and Cu (see FIG. 5) and also well-defined Pd surface redox features (see FIGS. 9 and 10). In addition, the bimetallic catalysts that showed the highest ORR activity are characterized by alloy nanoparticles comprising Cu and Pd at approximately a 50:50 atomic ratio (Table 3). Accordingly, the ordered Pd—Cu phase may provide beneficial attributes for the ORR reaction.

Figure 13:
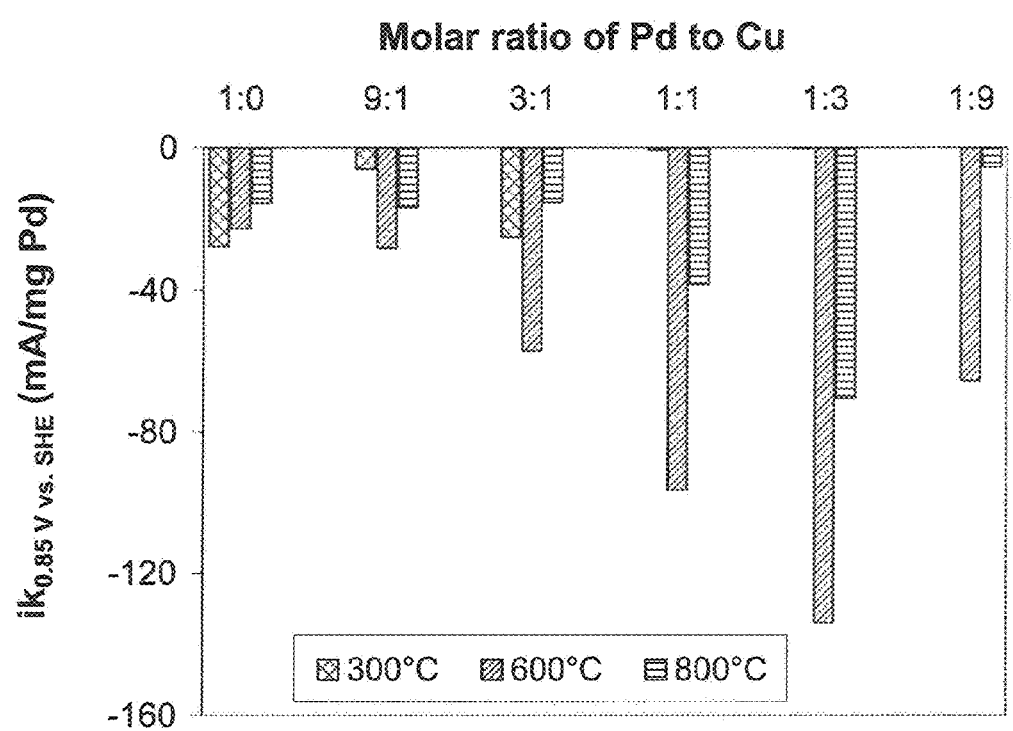
FIG. 13 shows ORR activity, normalized to the weight of Pd, after acid treatment of various compositions of the Pd—Cu catalysts treated at three different temperatures.

All the catalysts tested above were treated with acid by mixing with 0.6 M $HClO_4$ for a few days and their ORR activity was determined after the treatment, in order to examine the stability of the catalysts and to remove possible unwanted phases such as Cu. The catalysts' composition and ORR activity after acid treatment are summarized in Tables IV-V and FIG. 13, respectively. The data in Tables IV-V indicate that acid treatment not only dissolves away unalloyed Cu, but also removes some of the alloyed Cu. This observation is supported by the results of (9:1)Pd:Cu/C, (1:1) Pd:Cu/C, (1:3)Pd:Cu/C, and (1:9)Pd:Cu/C treated at 300° C. and those of (1:9)Pd:Cu/C treated at 600° C., showing complete removal of Cu. Copper is also partially dissolved from all other compositions, as reflected by variation in the composition before and after acid treatment. This may indicate a stability issue for the Pd—Cu bimetallic catalyst in the acidic media.

TABLE IV

Composition in mol % for the catalysts, treated at the temperatures indicated, after acid treatment

| Sample | Original Pd:Cu | 300° C. Pd:Cu | 600° C. Pd:Cu | 800° C. Pd:Cu |
|---|---|---|---|---|
| (9:1)Pd:Cu | 90:10 | 100:0 | 91:09 | 91:09 |
| (3:1)Pd:Cu | 76:24 | 90:10 | 78:22 | 76:24 |
| (1:1)Pd:Cu | 50:50 | 89:11 | 61:39 | 53:47 |
| (1:3)Pd:Cu | 25:75 | 100:0 | 51:49 | 39:61 |
| (1:9)Pd:Cu | 17:83 | 100:0 | 100:0 | 26:74 |

TABLE V

Composition in weight percent of the Pd—Cu catalysts, treated at various temperatures, after acid treatment

| | Original (wt %) | | 300° C. (wt %) | | 600° C. (wt %) | | 800° C. (wt %) | |
|---|---|---|---|---|---|---|---|---|
| Sample | Pd | Cu | Pd | Cu | Pd | Cu | Pd | Cu |
| (9:1)Pd:Cu | 20.3 | 1.35 | 19.2 | 0.00 | 18.0 | 1.11 | 19.2 | 1.18 |
| (3:1)Pd:Cu | 16.3 | 3.27 | 15.8 | 0.90 | 13.8 | 2.42 | 15.4 | 2.96 |
| (1:1)Pd:Cu | 10.6 | 6.57 | 10.4 | 0.00 | 7.87 | 2.70 | 9.21 | 4.84 |
| (1:3)Pd:Cu | 5.23 | 9.46 | 5.04 | 0.00 | 3.73 | 1.03 | 4.29 | 3.34 |
| (1:9)Pd:Cu | 1.96 | 11.2 | 2.23 | 0.00 | 2.33 | 0.00 | 2.15 | 1.91 |
| (1:0)Pd:Cu | 7.52 | | | | 6.36 | | 7.11 | |

Despite some Pd leaching, the acid treatment leads to enrichment of Pd in the catalyst, as reflected by the higher molar ratio of Pd to Cu in the catalysts after acid treatment. As the heat treatment temperature was increased, the amount of Pd and Cu leached from the catalysts decreased indicating better catalyst stability. The improved stability with increasing heat treatment temperature may be attributed to the effect of particle size and the degree of alloying on the dissolution of the metal in acid. Therefore, the stability of the catalysts may be improved by varying catalyst processing conditions. It can also be enhanced by producing the Pd skin-Cu core nanostructure and/or by alloying with a third metal.

In comparison with the catalysts without acid treatment, the acid treatment in general improves the ORR activity of the catalysts, but does not change the trend of ORR activity versus catalyst composition. For example, the highest ORR activity was still observed for the (1:3)Pd:Cu/C and (1:1)Pd: Cu/C treated at 600° C., but with about 30% increase in the ORR activity compared to the same samples before acid treatment. This enhancement may be attributed to following effects of acid treatment: (1) exposure of desired alloy surface after removing unalloyed Cu, (2) Pd-rich surface formed after removing alloyed surface Cu on the catalyst nanoparticles, and (3) increasing active surface area of the catalyst by creating more pores or defects from dissolution. It was also found that the acid treated (1:3)Pd:Cu/C and (1:1)Pd:Cu/C treated at 600° C. showed virtually identical lattice constants (3.749 Å and 3.755 Å, respectively) to that of their counterparts before acid treatment. The nanoparticle composition (36.5±4.7 and 39.6±6.5 at % Cu, respectively) did not differ significantly from the compositions before acid treatment.

The best ORR activity for the Vulcan carbon supported Pd—Cu bimetallic system observed here (101 mA/mgPd) is approximately four times lower than that reported for the commercial Pt/Vulcan catalyst (410 mA/mgPt, 2.8 nm Pt particles) at room temperature (20° C.) and at 0.85 V. However, in the mass-specific ORR activity for the Pd—Cu catalyst may be improved through, for example, optimizing the particle size of the Pd—Cu bimetallic catalysts.

EXAMPLE 2

Starting metal precursors of $Pd(OAc)_2$ and $Cu(OAc)_2$ are added to 2-ethoxyethanol. The mixture is stirred in a $N_2$ gas atmosphere, heated in the presence of conventional organic capping molecules, for example, oleylamine and oleic acid. The mixture then undergoes a reduction reaction to form a plurality of organic shell-metal nanoparticle cores substantially characterized by a base metal and a noble metal preferentially segregated to the outer surface of the particle. These particles are then dispersed on a carbon support, subjected to an $O_2/N_2$ atmosphere at treatment temperatures of about 200-300° C. for about one to two hours and then to a $H_2/He$ atmosphere at treatment temperatures of about 400-800° C. for about two to about six hours to activate the final end product catalyst.

In a typical procedure for the synthesis of (1:3)PdCu, for example, 0.0911 g of $Cu(OAc)_2$ (0.5 mmol), 0.0371 g of $Pd(OAc)_2$ (0.165 mmol), 130 mL of 2-ethoxyethanol, and 1.3 mL of oleic acid (4.09 mmol) were heated to 80° C. and the solution mixture stirred for 30 minutes. The solution mixture appeared greenish-blue. At this temperature, 0.45 mL of oleylamine (1.37 mmol) was added and the reaction mixture heated to 120° C. The solution immediately turned a bright blue color upon addition of oleylamine and then faded to near clear before slowly turning to a brown color, an indication that the reduction was taking place. The reaction was continued under reflux conditions under a nitrogen blanket for 2 hours. The solution had a brown color with dark particles. After the reaction mixture was allowed to cool to room temperature, the particles were isolated by centrifugation and the brown supernatant was discarded. The black precipitate was dispersed in hexane (50 mL) and precipitated out by adding ethanol (100 mL) and centrifuging. The precipitate was dried under $N_2$ and the purified nanoparticle product re-dispersed in hexane.

Formation of carbon-supported catalysts was accomplished by employing carbon black XC-72R, obtained from Cabot, as a support material. The carbon black was first pretreated by heating at 900° C. for 1 hour in flowing nitrogen and then suspending in hexane followed by sonication for at least 3 hours at room temperature. A controlled amount of Pd—Cu nanoparticles was added into the suspension and sonicated for 30 min, followed by stirring overnight. Thus, the prepared carbon-supported Pd—Cu powders were collected and dried under $N_2$. The loading of Pd—Cu on the carbon support was controlled by monitoring the weight ratio of Pd—Cu nanoparticles relative to carbon black. Typical preparations with a Pd metal loading of 10 wt % were made.

Thermal Activation and Calcination. The carbon-loaded nanoparticles were treated in a tube-furnace under controlled temperature and atmosphere to remove the organic capping molecules. A typical protocol included shell removal by annealing at 190° C. under 20% $O_2/N_2$ for 5 hours and calcination at 300° C., 400° C. or 500° C. under $H_2$ for 4 hours. The carbon-loaded Pd or Pd—Cu nanoparticles are denoted as Pd/C or PdCu/C.

EXAMPLE 3

$PdCl_2$ and $CuCl_2$ are each dissolved in ethylene glycol and ammonia solution and added to form metal salt complex. The pH is then adjusted to about 12, carbon black (Vulcan XC-72R from Cabot) is added, and the is mixture stirred. The resulting mixture is heated, resulting in the reduction reaction to form metal nanoparticle cores. The product is then subjected to a $H_2$/He atmosphere at treatment temperatures of about 500° C. for two hours to activate the final end product catalyst.

1:3 PdCu/C catalyst has been prepared by using ammonia as a complexing agent. At first Vulcan XC-72R carbon black was pretreated with 35% $HNO_3$ under refluxing condition to introduce surface functional groups before being suspended in ethylene glycol solution (72 mg carbon+60 mL ethylene glycol). A calculated amount of $PdCl_2$ solution (0.3439 g) (5 wt. % in 10 wt. % HCl) was dissolved in 20 mL ethylene glycol at room temperature 2 mL of aqueous ammonia (30%, v/v) was added to $PdCl_2$ solution and the color of the solution changed to colorless indicating formation of $[Pd(NH_3)_4]^{2+}$ complex. The pH of the mixture was adjusted to about 12 using 2 mL aqueous NaOH solution (1.0 M). In a separate flask, the calculated amount of $CuCl_2$ (0.0478 g) was dissolved in 15 mL ethylene glycol at room temperature. Two milliliters of aqueous ammonia (30%, v/v) were added to the $CuCl_2$ solution. The color of the solution changed to bright blue indicating formation of $[Cu(NH_3)_4]^{2+}$ complex. The pH of the mixture was adjusted to about 12 using 2 mL aqueous NaOH solution (1.0 M). The $[Pd(NH_3)_4]^{2+}$ complex solution and the $[Cu(NH_3)_4]^{2+}$ complex solution were mixed together and stirred for 30 minutes followed by addition of the pre-dispersed carbon suspension. The resulting mixture was stirred for 30 minutes and was then heated slowly up to 130° C. over a period of 1 hour. The mixture was then refluxed for at least 3 hours at this temperature. After cooling to room temperature the solvent was removed in a rotary evaporator using silicone oil bath heated to 150° C. The sample was dried in a vacuum oven at 100° C. overnight.

The obtained PdCu/C sample was subjected to heat treatment under 3.67% $H_2$/He at 500° C. In one operation, the sample was placed in a ceramic boat which was then placed in a ceramic tube furnace. A mixture of 3.67% $H_2$/He was first flowed through the tube furnace for 1 hour at room temperature. The temperature of the furnace was ramped at 10° C. $min^{-1}$ to 500° C. and the temperature held at 500° C. for 2 hours. Afterwards the furnace was cooled to room temperature at a rate of 10° C. $min^{-1}$ under a 3.67% $H_2$/He atmosphere. The resulting sample was washed with hot distilled water to remove chloride and other impurities and then dried in a vacuum oven at 80° C. for two days.

The foregoing description of embodiments of the present invention has been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A method of preparing a metal alloy nanoparticle having enhanced catalytic properties, comprising:
    providing a first noble metal precursor including a first noble metal;
    providing a first base metal precursor including a first base metal, the first base metal selected based on the first noble metal to effect the electronic configuration of the first noble metal and to preferentially segregate the first noble metal to the surface of the metal alloy nanoparticle;
    combining a predetermined nominal molar ratio of between about 1:3 and about 3:1 of the first noble metal precursor and the first base metal precursor to form a mixture; and
    reducing the mixture to form a plurality of metal alloy nanoparticles having a surface shell consisting of the first noble metal and a core of the first noble metal and the base metal and forming a catalytically active surface layer on each of the plurality of metal alloy nanoparticles by further segregating the first noble metal to the surface by heat treating the mixture in a heated hydrogen-containing atmosphere substantially free of oxidizing gas, wherein the mixture is not exposed to a heated oxidizing atmosphere before heat treating the mixture.

2. The method of claim 1, further comprising depositing the mixture on a carbon substrate to form a polymetallic catalyst substantially free of Pt, and wherein the polymetallic catalyst is characterized by an ORR activity of at least about twice the ORR activity of a monometallic catalyst formed from the first noble metal.

3. The method of claim 2, further comprising treating the polymetallic catalyst with an acid to remove at least a portion of an unwanted phase from the polymetallic catalyst.

4. The method of claim 2, further comprising incorporating the polymetallic catalyst in a fuel cell.

5. The method of claim 1, wherein the first noble metal is selected from the group consisting of: Pd, Ir, Rh, and Au.

6. The method of claim 1, wherein the first base metal is selected from the group consisting of: Cu, Fe, Co, Ni, Zn, Ta, W, Re, and Mo.

7. The method of claim 1, wherein the first noble metal precursor comprises Pd, and wherein the first base metal precursor comprises Cu.

8. The method of claim 7, wherein the heated hydrogen-containing atmosphere consists of hydrogen in an inert gas.

9. The method of claim 8, wherein the heated hydrogen-containing atmosphere is between about 600° C. and about 800° C.

10. The method of claim 7, wherein the hydrogen-containing atmosphere has from about 3 percent to about 4 percent hydrogen.

11. A method of preparing a metal alloy nanoparticle having enhanced catalytic properties, comprising:
providing a first noble metal precursor where the first noble metal is selected from the group consisting of: Pd, Ir, Rh, and Au;
providing a first base metal precursor where the first base metal is selected from the group consisting of: Co, Cu, Fe, Ni, Mo, Re, Ta, W and Zn, the first base metal precursor selected based on the selection of the first noble metal precursor to effect the electronic configuration of the first noble metal and to cause the first noble metal precursor to segregate to the surface of the metal alloy nanoparticle;
adding the first noble metal precursor and the first base metal precursor to an organic solvent to form a mixture;
adding organic capping molecules to the mixture;
reducing the mixture to form a plurality of intermetallic metal alloy compound nanoparticles substantially capped by an organic shell, the plurality of intermetallic metal alloy compound nanoparticles characterized by a metal shell consisting of the first noble metal;
forming carbon-loaded nanoparticles by depositing the plurality of intermetallic metal alloy compound nanoparticles having an organic shell cap on a high surface area carbon substrate powder; and
heating the carbon-loaded nanoparticles in a hydrogen-containing atmosphere at a temperature between about 300° C. and about 800° C. to remove the organic shell cap from the plurality of intermetallic metal alloy compound nanoparticles,
wherein the plurality of intermetallic metal alloy compound nanoparticles are substantially free of Pt.

12. The method of claim 11, wherein the plurality of intermetallic metal alloy compound nanoparticles are further characterized by a core disposed within the metal shell, the core consisting essentially of the first base metal and the first noble metal.

13. The method of claim 11, wherein the first noble metal precursor comprises an acetoxy group.

14. The method of claim 11, wherein the first noble metal precursor comprises Pd, and wherein the base metal precursor comprises Cu.

15. A method of preparing a metal alloy nanoparticle having enhanced catalytic properties, comprising:
providing a first noble metal complex mixture including a first noble metal selected from the group consisting of: Pd, Ir, Rh, and Au;
providing a first base metal complex mixture including a first base metal, the first base metal to effect the electronic configuration of the first noble metal and to cause the first noble metal to segregate to the surface of the metal alloy nanoparticle, and selected from the group consisting of: Cu, Fe, Co, Ni, Zn, Ta, W, Re, and Mo;
increasing the pH of the first noble metal complex mixture and the first base metal complex mixture;
combining the first noble metal complex mixture and the first base metal complex mixture to form a complex salt solution having a first noble metal and first base metal nominal molar ratio from about 1:3 to about 3:1;
adding a carbon support to the complex salt solution to form a resulting mixture;
heating the resulting mixture in an atmosphere of hydrogen in an inert gas to reduce the resulting mixture and to drive the segregation of noble metal to the nanoparticle surface to form a product including a plurality of metal alloy nanoparticles characterized by a shell consisting of the first noble metal surrounding a core of the first base metal and the first noble metal.

16. The method of claim 15 wherein the base metal is selected based on assessment of the density functional theory calculation of ability of the base metal to modify the electronic properties of the noble metal and to energetically prefer to reside in the interior of the nanoparticle.

17. The method of claim 15 wherein the heat treatment comprised heating to a temperature between about 600° C. and 800° C.

18. The method of claim 15 wherein the noble metal consists essentially of Pd and the base metal consists essentially of Cu.

19. A catalytic composition of matter, consisting essentially of a Pd:Cu nanoparticle having a nominal molar ratio of between about 3:1 to 1:3, the nanoparticle defined by a shell consisting of Pd disposed about a core of Pd and Cu, prepared by co-impregnation of a noble metal and a base metal into a high surface area carbon substrate and treated in a hydrogen containing atmosphere.

* * * * *